(12) United States Patent
Dantu et al.

(10) Patent No.: US 7,068,624 B1
(45) Date of Patent: Jun. 27, 2006

(54) WIRELESS ROUTER AND METHOD FOR PROCESSING TRAFFIC IN A WIRELESS COMMUNICATIONS NETWORK

(75) Inventors: Ramanamurthy Dantu, Richardson, TX (US); Pulin R. Patel, McKinney, TX (US); Ojas T. Choksi, Plano, TX (US); Achal R. Patel, McKinney, TX (US); Mohammad R. Ali, Plano, TX (US); Jerzy Miernik, Allen, TX (US); Balajl S. Holur, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/513,914

(22) Filed: Feb. 25, 2000

(51) Int. Cl.
*H04L 12/56* (2006.01)

(52) U.S. Cl. .................. 370/331; 370/356; 370/409

(58) Field of Classification Search ........... 370/310, 370/338, 329, 331, 356, 389, 392, 409, 352; 455/436, 442
See application file for complete search history.

(56) References Cited

U.S. PATENT DOCUMENTS

| | | | |
|---|---|---|---|
| 5,257,283 A | 10/1993 | Gilhousen et al. | 375/1 |
| 5,293,640 A | 3/1994 | Gunmar et al. | 455/33.1 |
| 5,561,839 A | 10/1996 | Osterberg et al. | 455/33.1 |
| 5,603,085 A | 2/1997 | Shedlo | 455/33.1 |
| 5,666,356 A | 9/1997 | Fleming et al. | 370/328 |
| 5,734,967 A | 3/1998 | Kotzin et al. | 455/63 |
| 5,745,480 A | 4/1998 | Behtash et al. | 370/252 |
| 5,768,260 A | 6/1998 | Lindgren et al. | 370/252 |
| 5,805,585 A | 9/1998 | Javitt et al. | 370/342 |
| 5,812,531 A * | 9/1998 | Cheung et al. | 370/255 |
| 5,862,485 A | 1/1999 | Linneweh, Jr. et al. | 455/450 |
| 5,918,016 A | 6/1999 | Brewer et al. | 395/200.5 |
| 5,923,650 A | 7/1999 | Chen et al. | 370/331 |
| 5,949,760 A | 9/1999 | Stevens et al. | 370/254 |
| 5,987,326 A | 11/1999 | Tiedemann, Jr. et al. | 455/442 |
| 5,995,805 A | 11/1999 | Ogasawara et al. | 455/13.1 |
| 6,021,309 A | 2/2000 | Sherman et al. | 455/12.1 |

(Continued)

FOREIGN PATENT DOCUMENTS

EP 0 831 669 A2 3/1998

(Continued)

OTHER PUBLICATIONS

Schoen et al. "Convergence Between Public Switching and the Internet". IEEE. Jan. 1998. pp. 50-65.*

(Continued)

*Primary Examiner*—Derrick Ferris
(74) *Attorney, Agent, or Firm*—Baker Botts L.L.P.

(57) ABSTRACT

A wireless communications network includes a wireless-specific router topology layer that connects cellular sites to a wireline topology. The wireless-specific router topology provides a distributed architecture in which call processing including call setup, resource preservation, air bandwidth allocation, switching, soft handoff, and micromobility is performed at the cell level. The wireless routers are technology independent to support various cellular technologies. The wireless router may include a first interface operable to communicate wireless packets for a call with a remote device and a second interface operable to communicate wireline packets for the call with the wireline network. A traffic controller is coupled to the first and second interfaces and operable to convert traffic between the wireless and wireline packets and to route packets to a destination mobile or wireline device. A selection and distribution unit is operable to select and distribute traffic to support soft handoff for calls in the wireless communications network.

37 Claims, 13 Drawing Sheets

U.S. PATENT DOCUMENTS

| | | | |
|---|---|---|---|
| 6,070,084 A | 5/2000 | Hamabe | 455/522 |
| 6,157,668 A | 12/2000 | Gilhousen et al. | 375/130 |
| 6,181,738 B1 | 1/2001 | Chheda et al. | 375/224 |
| 6,226,283 B1 | 5/2001 | Neumiller et al. | 370/340 |
| 6,256,300 B1* | 7/2001 | Ahmed et al. | 370/331 |
| 6,289,005 B1 | 9/2001 | Katz | 370/328 |
| 6,304,562 B1 | 10/2001 | Kim et al. | 370/332 |
| 6,327,254 B1 | 12/2001 | Chuah | 370/328 |
| 6,421,731 B1 | 7/2002 | Ciotti, Jr. et al. | 709/238 |
| 6,434,134 B1 | 8/2002 | La Porta et al. | 370/338 |
| 6,456,599 B1 | 9/2002 | Elliott | 370/254 |
| 6,496,505 B1* | 12/2002 | La Porta et al. | 370/392 |
| 6,496,694 B1* | 12/2002 | Menon et al. | 455/426.2 |
| 6,574,473 B1* | 6/2003 | Rinne et al. | 455/436 |
| 6,587,457 B1* | 7/2003 | Mikkonen | 370/356 |
| 2001/0025321 A1* | 9/2001 | Tang et al. | 709/246 |
| 2002/0032800 A1* | 3/2002 | Puuskari et al. | 709/246 |

FOREIGN PATENT DOCUMENTS

| | | |
|---|---|---|
| EP | 0 841 763 A1 | 5/1998 |
| EP | 1 041 850 A1 | 10/2000 |
| WO | WO 98/45966 | 10/1998 |
| WO | WO 98/52288 | 11/1998 |
| WO | WO 99/53630 | 10/1999 |
| WO | WO-00/45560 * | 8/2000 |

OTHER PUBLICATIONS

Perkins, Charlie. "Mobile IP and Security Issue: An Overview". IEEE. Oct. 25, 1999-Oct. 25, 1999. pp. 131-148.*

Hamdi et al. "Voice Service Interworking for PSTN and IP Networks". IEEE. May 1999. pp. 104-111.*

*Data Networks*, Bertsekas et al., 1987.

"On the Capacity of a Cellular CDMA System," Gilhousen et al., *IEEE* 1991, 10 pages.

"Erlang Capacity of a Power Controlled CDMA System," Viterbi et al., *IEEE* 1993, 9 pages.

B. Bakshi, et al., "Improving Performance of TCP over Wireless Networks," IEEE 17th International Conference on Distributed Computing Systems, 10 pages, May, 1997.

Timothy Ju and Gary Ogasawara, "Congestion Control By Traffic Shaping for Ground/Satellite Network," XP-002140800, Milcom '97 Proceedings, Nov. 2-5, 1997, 5 pages.

U.S. Appl. No. 09/174,273, entitled "Method and Apparatus for Class Based Transmission Control of Data Connections Based on Real-Time External Feedback Estimates Obtained Using Messaging from a Wireless Network," filed Oct. 16, 1998, 35 pages, Oct. 18, 1998.

S. Biaz and N. Vaidya, "Discriminating Congestion Losses from Wireless Losses using Inter-Arrival Times at the Receiver," IEEE Symposium Application-Specific Systems and Software Engineering Technology (ASSET), 8 pages, Mar., 1999.

G. Holland and N.H. Vaidya, "Analysis of TCP Performance over Mobile Ad Hoc Networks," Fifth Annual ACM/IEEE International Conference on Mobile Computing and Networking (MOBICOM), 13 pages, Aug., 1999.

G. Holland and N.H. Vaidya, "Impact of Routing and Link Layers on TCP Performance in Mobile Ad Hoc Networks," IEEE Wireless Communications and Networking Conference (WCNC), 5 pages, Oct., 1999.

U.S. Appl. No. 09/466,308, entitled "Method and System for Allocating Bandwidth in a Wireless Communications Network," filed Dec. 17, 1999, 85 pages.

U.S. Appl. No. 09/513,913, entitled "Method and System for Managing Transmission Resources in a Wireless Communications Network" filed Feb. 25, 2000, 73 pages.

U.S. Appl. No. 09/513,090, entitled "Method and System for Configuring Wireless Routers and Networks," filed Feb. 25, 2000, 94 pages.

U.S. Appl. No. 09/513,592, entitled "Method and System for Brokering Bandwidth in a Wireless Communications Network," filed Feb. 25, 2000, 50 pages.

U.S. Appl. No. 09/513,912, entitled "Method and System for Queuing Traffic in a Wireless Communications Network," Feb. 25, 2000, 94 pages.

CA*net II Differentiated Services. Bandwidth Broker System Specification, British Columbia Institute of Technology, Technology Centre, Group for Advanced Information Technology, http://www.internet2.edu/qos/gbone/QB_BAC.shtml, Online Oct. 4, 1998, XP-002136418, 13 pages, Printed Apr. 25, 2000.

U.S. Appl. No. 09/591,077, entitled "Method and System for Dynamic Soft Handoff Resource Allocation in a Wireless Network," Jun. 9, 2000, 66 pages.

U.S. Appl. No. 09/908,225, entitled "Method and System of Integrated Rate Control for a Traffic Flow Across Wireline and Wireless Networks," filed Jul. 18, 2001, 32 pages.

"TCP and Explicit Congestion Notification," Floyd, Lawrence Berkeley Laboratory, DE-AC03-76SF00098, 16 pages.

Pearlman, *"Determining the Optimal Configuration for the Zone Routing Protocol"*, IEEE Journal on Selected Areas in Communications, vol. 17, No. 8, pp. 1395-1414 and 3 pages of Abstract, Index Terms, Documents to Cite, and References, Aug. 1999.

Cohen, et al., *"IP Addressing and Routing in a Local Wireless Network"*, INFOCOM '92, CH3133-6/92/0000-0626, pp. 5A.3.1-5A.3.7 and 1 page of Abstract, Index and Documents to Cite, 1992.

* cited by examiner

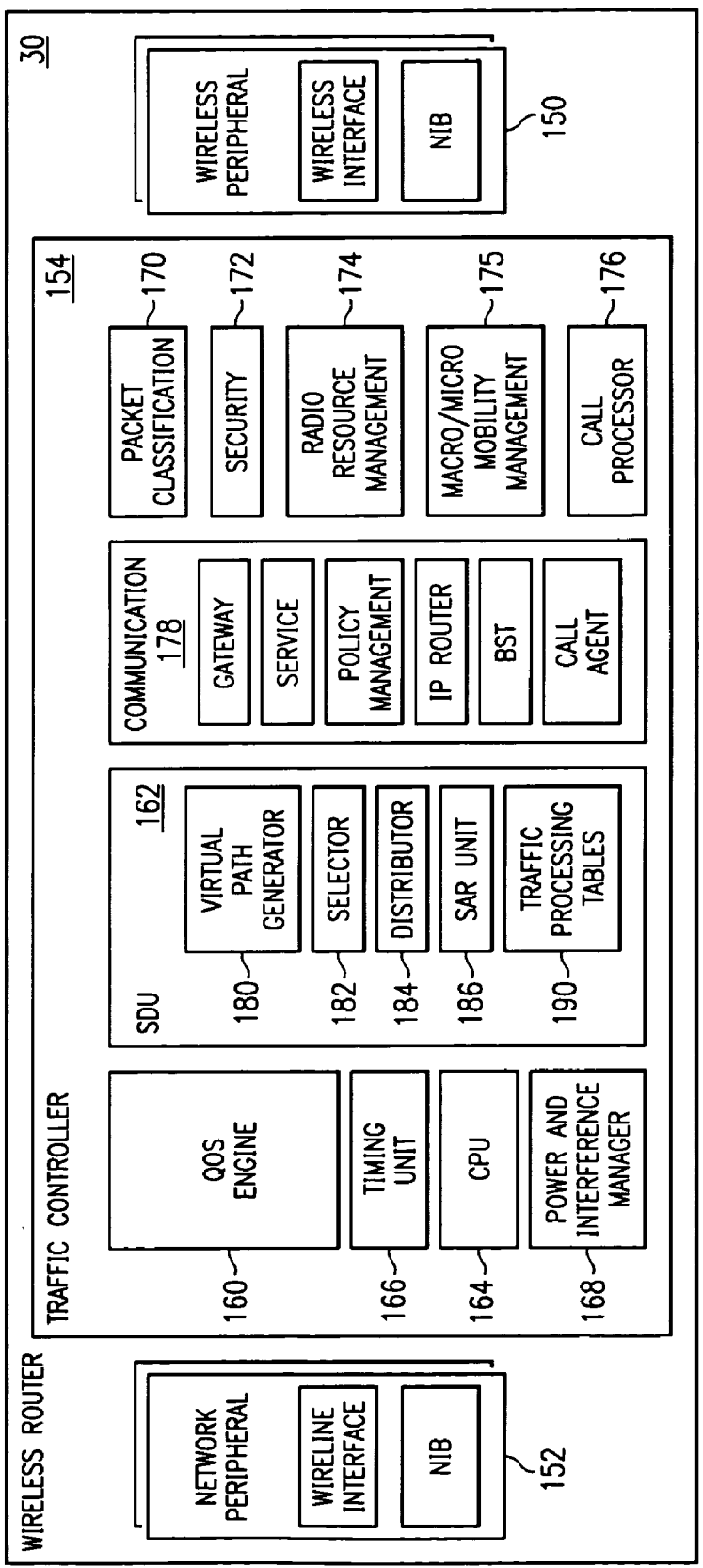

| DESTINATION IP ADDRESS | OUTGOING INTERFACE ID | | OUTGOING PORT ID | | DATA LINK ADDRESS LOGICAL CIRCUIT (EX: LSP) LABEL | | HOP COUNT ASSOCIATED WITH THE DESTINATIONS | | MULTICAST (IF YES) POINTER TO ANOTHER TABLE |
|---|---|---|---|---|---|---|---|---|---|
| | PRIMARY | SECONDARY | PRIMARY | SECONDARY | PRIMARY | SECONDARY | PRIMARY | SECONDARY | |

IP FORWARDING TABLE

| HEAD END ROUTER ID | TAIL END ROUTER ID | NEXT HOP ROUTER ID | LABEL | TUNNEL ID | TOS | OUTGOING INTERFACE ID (IPV6/IPV4) 4/16 BYTES | DELAY METRIC | THROUGHPUT METRIC | LEVEL 3 ID (USED BY TUNNEL) | LOCAL REROUTING (PROTECTION) AVAILABLE | SETUP PRIORITY | HOLDING PRIORITY | NUMBER OF HOPS | DELAY CONSTRAINT |
|---|---|---|---|---|---|---|---|---|---|---|---|---|---|---|
| | | | | | | | | | | | | | | |

MPLS TUNNEL TABLE

WIRELESS ROUTER AND METHOD FOR PROCESSING TRAFFIC IN A WIRELESS COMMUNICATIONS NETWORK

RELATED APPLICATIONS

This application is related to U.S. patent application Ser. No. 09/513,912 issued as U.S. Pat. No. 6,865,185 entitled "Method and System for Queuing Traffic in a Wireless Communications Network," U.S. patent application Ser. No. 10/309,393 entitled "Method and System for Managing Transmission Resources in a Wireless Communications Network" U.S. patent application Ser. No. 09/513,592 entitled "Method and System for Brokering Bandwidth in a Wireless Communications Network," and U.S. patent application Ser. No. 09/513,090 entitled "Method and System for Configuring Wireless Routers and Networks" all filed on Feb. 25, 2000 and incorporated herein by reference.

TECHNICAL FIELD OF THE INVENTION

The present invention relates generally to the field of wireless communications and more particularly to a wireless router and method for processing traffic in a wireless communications network.

BACKGROUND OF THE INVENTION

Wireline Internet protocol (IP) provides efficient connectivity between remote devices. IP networks are implemented with routers that interconnect physically and logically separate network segments. In operation, the routers distinguish data packets according to network protocols and forward traffic according to network-level addresses utilizing information that the routers exchange among themselves to find the best path between network segments. As the status of routers change in the network, the routers exchange information to reroute traffic around congested or failed routers or to route traffic to a newly activated router.

Cellular and other wireless networks have been connected to IP networks in order to allow cellular phones and other mobile devices to communicate with remote devices over the IP network. A typical cellular network covers a contiguous area that is broken down into a series of cells. Each cell has a base station that provides a radio frequency (RF) link for cellular phones within the cell. As cellular phones move between cells, the calls are handed off between base stations to provide continuous coverage.

The base stations are managed by a base station controller which performs handoffs and other intercell operations. A mobile switching center is connected to the base station controllers and switches all traffic in the cellular network. A data interworking function provides connectivity from the mobile switching center to the Internet or other data network via circuit switched and packet switched data protocols.

Within conventional cellular networks, the mobile switching centers are vulnerable to overloading during peak traffic times which may cause traffic to be delayed and/or dropped. In addition, available bandwidth between the base stations, base station controllers, and mobile switching centers is unnecessarily used by redundant messaging between the nodes. Another problem is the relatively low speed and reliability of call handoffs between cells.

SUMMARY OF THE INVENTION

The present invention provides a wireless router and method for processing traffic in a wireless communications network that substantially eliminate or reduce the problems and disadvantages associated with previous methods and systems. In particular, cellular and other wireless networks are implemented with wireless routers that provide an all-Internet protocol (IP) access network, distribute traffic processing functionality to the cells, and seamlessly interwork with the core IP network.

In accordance with one embodiment of the present invention, a wireless router includes a first interface operable to communicate wireless packets for a call with a mobile device and a second interface operable to communicate wireline packets for the call with a wireline network. A traffic controller is operable to convert wireline packets received for the call from the wireline network to wireless packets, to route the wireless packets to the mobile device through the first interface, to convert wireless packets received from the mobile device to wireline packets, and to route the wireline packets to the wireline network through the second interface.

In accordance with another aspect of the present invention, a wireless router includes a first interface operable to communicate traffic for a call with a mobile device and a second interface operable to communicate traffic for the call with a wireline network. A virtual path generator is operable to configure a wireless virtual path in the wireline network to a second wireless router. A traffic controller is operable to communicate with the second wireless router through the wireless virtual path to process traffic for the call.

More specifically, in accordance with a particular embodiment of the present invention, the wireless router includes a selector and a distributor for soft handoff call processing. In this embodiment, the selector is operable to receive a first instance of the wireless traffic from the mobile device, to receive a second instance of the wireless traffic from the second wireless router, and to select one of the instances for transmission to a destination device for the call. The distributor is operable to receive from the wireline network traffic destined for the mobile device, to transmit a first instance of the traffic to the mobile device, and to transmit a second instance of the traffic to the second wireless router for transmission to the mobile device. The virtual path may be a label switched path (LSP) and the traffic may be a radio frame.

In accordance with another aspect of the present invention, a wireless communications network includes a first and a second router. A first virtual path is configured between the first and second routers for transmission of wireline protocol traffic. A second virtual path is configured between the first and second routers for transmission of wireless protocol traffic. The first and second virtual paths may be LSPs, the wireline protocol traffic may be Internet protocol (IP) traffic and a wireless protocol traffic may be radio frames.

In accordance with yet another aspect of the present invention, a communications signal transmitted on a wireline link may include a radio frame having traffic for a call including a mobile device. A virtual path label is appended to the radio frame for routing the radio frame to a router for call processing. A virtual path label may be a multi-protocol label switched (MPLS) path label and may identify a primary router for processing the call.

In accordance with yet another aspect of the present invention, a wireless communications network includes a plurality of routers. Each router is operable to receive traffic from a mobile device and to route the traffic directly to an IP wireline network. The routers may intercommunicate with one another to establish a call and to reserve resources, allocate bandwidth, perform soft handoffs, and provide common ability for the call.

In accordance with yet another aspect of the present invention, a method and system for configuring a wireless communications network for processing a call includes receiving a communication from a mobile device identifying an active set of wireless routers for a call. The active set of wireless routers includes a primary wireless router and one or more secondary wireless routers for soft handoff of the call. The primary and secondary wireless routers are informed of their status. Virtual paths are configured between the primary and secondary wireless routers. Resources in the primary and secondary wireless routers are allocated for the call.

In accordance with still another aspect of the present invention, a method and system for providing mobility management for mobile devices in a wireless communications network includes providing an active set of wireless routers including an existing primary wireless router and a plurality of existing secondary wireless routers for performing soft handoff for a call. A new active set of wireless routers is received. The new active set identifies a new primary wireless router and a plurality of new secondary wireless routers. Existing virtual paths between the existing primary wireless router and the existing secondary wireless routers are terminated. Virtual paths between the new primary wireless router and the new secondary wireless routers are established. A network destination device of the call is informed of the new primary wireless router. Traffic for the call is queued at the new primary wireless router until traffic previously queued in the existing wireless router is processed.

Technical advantages of the present invention include providing a wireless router for a wireless communications network. The wireless router allows intelligence and call switching and control functionality to be distributed to the cell sites. As a result, transmission resources are efficiently used and common switching points that can lead to delayed and/or dropped traffic are reduced or eliminated.

Another technical advantage of the present invention includes providing a technology independent wireless network architecture. In particular, the wireless routers provide a simplified all IP wireless access network that seamlessly interworks with the core IP network. The wireless routers may each be provisioned to support any one of a number of wireless access technologies. As a result, new services and features may be readily provisioned in a wireless network and new technologies supported.

Yet another technical advantage of the present invention includes providing a distributed architecture for a wireless access network. In particular, call processing functionality is distributed to the base station or cell site level. Call set-up, resource reservation, air bandwidth allocation and switching functions are performed at the cell sites. As a result, traffic may be efficiently processed at the cell sites and centralized choke-points in the wireless network are reduced or eliminated. In addition, the distributed system requires fewer components which reduces system and maintenance costs and increase reliability.

Yet another technical advantage of the present invention includes providing an improved method and system for performing handoffs in a wireless network. In particular, the wireless routers set up MPLS or other virtual paths on a per call basis to perform traffic selection and distribution for soft handoffs. The MPLS paths improve the speed and efficiency of soft handoff operations in the wireless network.

Still another technical advantage of the present invention includes providing an improved micro mobility method and system within a wireless communications network. In particular, the wireless routers communicate among themselves as a mobile device transitions between cells to transfer call processing functionality between the routers and to reconfigure the MPLS paths. As a result, mobility management is distributed to and efficiently handled at the cell sites.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description, taken in conjunction with the accompanying drawings, in which:

FIGS. 5A–B are a series of block diagrams illustrating data packets transmitted in the multi-protocol label switch (MPLS) paths of FIG. 3 in accordance with one embodiment of the present invention;

FIG. 6 is a block diagram illustrating details of the wireless router of FIG. 1 in accordance with one embodiment of the present invention;

FIG. 9 is a block diagram illustrating details of the IP forwarding table of FIG. 8 in accordance with one embodiment of the present invention;

FIG. 10 is a block diagram illustrating details of the MPLS tunnel table of FIG. 8 in accordance with one embodiment of the present invention;

FIG. 11 is a block diagram illustrating details of the outgoing LSP table of FIG. 8 in accordance with one embodiment of the present invention;

FIG. 12 is a block diagram illustrating details of the incoming LSP table of FIG. 8 in accordance with one embodiment of the present invention;

DETAILED DESCRIPTION OF THE DRAWINGS

Figure 1:
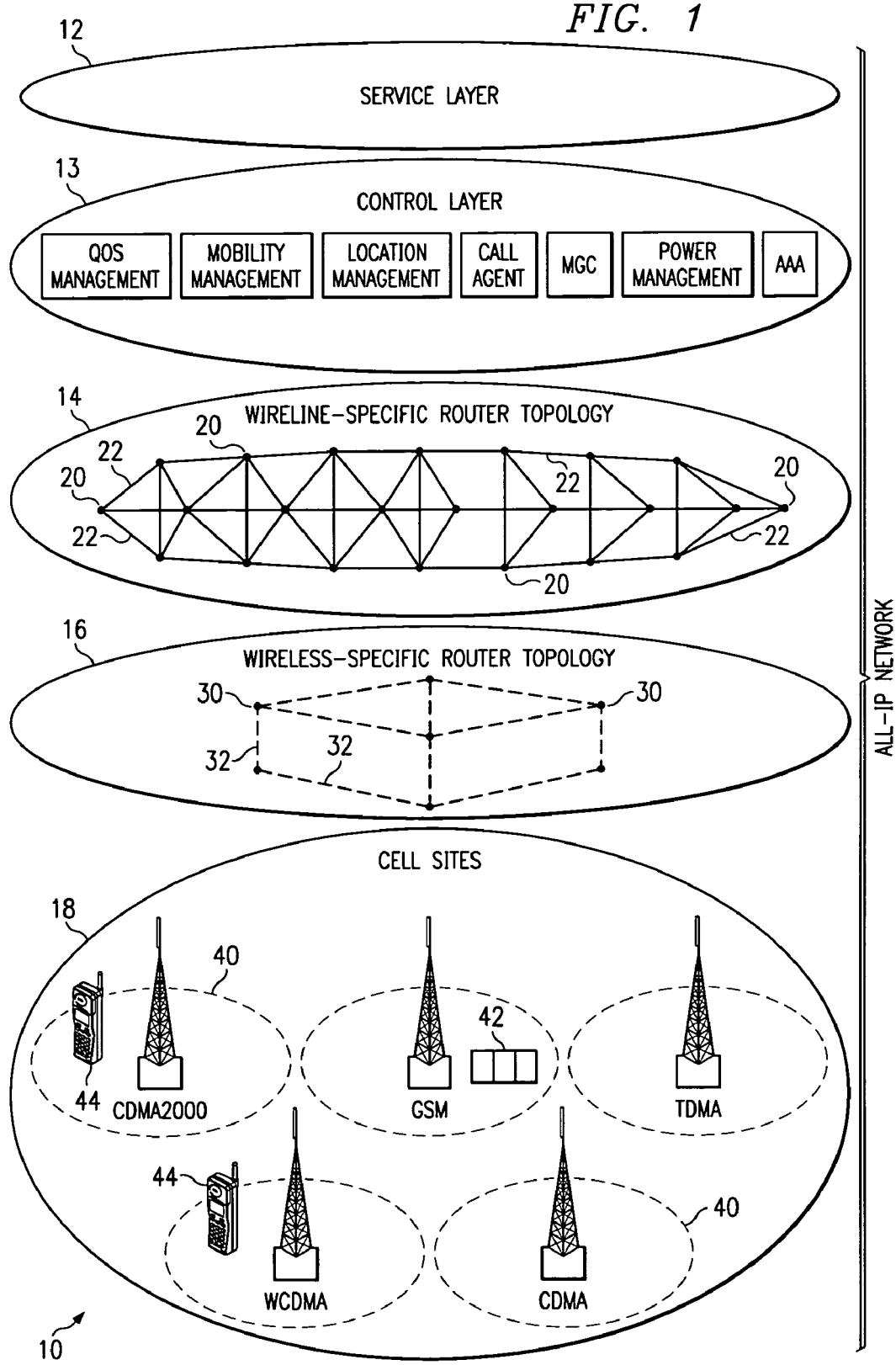
FIG. 1 is a block diagram illustrating layers of an all Internet protocol (IP) wireless communications network in accordance with one embodiment of the present invention.

FIG. 1 illustrates a wireless communications network 10 in accordance with one embodiment of the present invention. In this embodiment, the wireless network 10 is a multiple layer cellular network in which terrestrial wireless transmission originates in geographically delimited cells. It will be understood that the present invention may be used in connection with other suitable wireless networks.

Referring to FIG. 1, the wireless network 10 includes a service layer 12, a control layer 13, a wireline router layer 14, a wireless router layer 16, and a physical layer 18. The service layer 12 provides network services such as call server, bandwidth broker, policy server, service level agreement (SLA) manager, billing server, home location register (HLR), home subscriber server (HSS), domain name server (DNS), dynamic host configuration protocol (DHCP), media gateway (MGW), signaling gateway (SGW), legacy servers such as mobile switching center (MSC), base station controller (BSC), and serving GPRS serving node (SGSN), voicemail server (VMS), fax/modem server, short message center (SMSC), conferencing facilities, transcoders, and other suitable services. The control layer 13 provides a quality of service (QoS) manager, mobility manager, location manager, call agent, media gateway controller (MGC), power manager, authentication, authorization, and accounting (AAA), and other suitable agents and managers.

The wireline router layer 14 may be a wireline specific Internet protocol (IP) layer. The wireline router layer 14 includes a wireline router network having a plurality of wireline routers 20 interconnected by physical wireline links 22. The wireline routers 20 receive and transmit traffic on the wireline links 22. The wireline router network forms the core IP network and may be the Internet, intranet, extranet, or other suitable local, wide area network, or combination of networks.

The wireless router layer 16 may be a wireless-specific IP layer. The wireless router layer 16 includes a wireless router network having a plurality of wireless routers 30 interconnected by wireless router links 32. The wireless router links 32 may be microwave or other wireless links or virtual or other suitable flows configured in the wireline links 22 of the wireline IP layer 14. Each wireless router 30 may be implemented as a discrete node independent of a wireline router 20 or may be implemented as a logical layer in a wireline router 20.

The wireless routers 30 intercommunicate traffic and control information over the wireless router links to perform call set up, resource reservation, mobility management, soft handoff, air bandwidth allocation and routing. As described in more detail below, the wireless router links 32 may comprise multi-protocol label switch (MPLS) or other suitable virtual tunnels formed in the wireline links 22. The wireless routers 30 may be self-configuring as described in co-owned U.S. patent application entitled "Method and System for Configuring Wireless Router and Network," previously incorporated by reference.

The wireless routers 30 are connected to the wireline routers 20 by wireline links. In this way, the wireless routers 30 provide connectivity from the wireless portion of the network 10 to the wireline portion of the network 10 via circuit switched and packet switched data protocols. Thus, the wireless routers 30 receive and route traffic over both wireline and wireless links 22 and 32.

The physical layer 18 includes a series of overlapping cells 40. Each cell 40 is supported by a corresponding wireless router 30 and may be subdivided into a plurality of geo-location areas 42. The geo-location areas 42 are each a defined area in which bandwidth may be allocated to mobile devices 44. Further information regarding the geo-location areas and allocation of bandwidth within geo-location areas is described in co-owned U.S. patent application Ser. No. 09/466,308, entitled "Method and System for Allocating Bandwidth in a Wireless Communications Network," filed Dec. 17, 1999, which is hereby incorporated by reference.

In the wireless network 10, each wireless router 30 provides a radio frequency (RF) link for mobile devices 44 within a corresponding cell 40. The wireless RF link to the mobile devices 44 in the cell 40 may be based on established technologies, or standards such as IS-54 (TDMA), IS-95 (CDMA), GMS and AMPS, 802.11 based WLAN, or new upcoming technologies such as CDMA 2000 and W-CDMA or proprietary radio interfaces. The mobile devices 44 may be cell phones, data phones, data devices, portable computers, or any other suitable device capable of communicating information over a wireless link.

Due to the nature of the RF airlink, the interference generated by the usage of various mobile devices 44 is inter-dependent. That is, the interference generated by the usage of a mobile device 44 including transmitting and receiving signals is not only dependent on its geo-location, but is also dependent on the geo-location of surrounding mobile devices 44 and the usage of those devices. Thus, the cellular network is an inherently interference-limited network with bandwidth usage in a particular location impacting the interference in specific areas of the neighborhood. In complete spectrum sharing systems such as CDMA and W-CDMA, bandwidth usage in a particular area directly impacts the bandwidth available at different locations in the neighborhood.

In operation, the wireless routers 30 each have a defined bandwidth with which to communicate with the mobile devices 44 in the cells 40. The bandwidth is used by the wireless router 30 and the mobile devices 44 to communicate voice and data information. The supported bandwidth is a function of various factors such as frequency reuse, carrier to interface ratio, bit-energy to noise ratio, effective bit-rate per connection and the like. The bandwidth available to allocate to certain flows is geo-location dependent, and time dependent based on current usage of other flows in the geo-neighborhood.

The wireless routers 30 each allocate bandwidth within a corresponding cell 40, route traffic to and from the cell 40, and track the location of the mobile devices 44 within the cell 40. The position of a mobile device 44 may be determined using network-assist, global position systems (GPS) and radio frequency fingerprinting. Preferably, the positioning technique provides fast and accurate information with respect to the location of the mobile device 44 to minimize acquisition time for position information.

As mobile users move from cell 40 to cell 40, the wireless routers 30 perform soft handoff operations to provide continuous connectivity within the network. As described in more detail below, the wireless routers 30 provide additional call control and switching functionality to provide an all-IP wireless access network with seamless interworking with core IP network elements in a distributed control architecture. As a result, transmission resources are efficiently used and choke-points in the system are reduced or eliminated. In addition, the all-IP architecture is technology independent which allows routers 30 to be provisioned to support one of a number of wireless access technologies. New service and features may be readily provisioned to the wireless routers 30 and new technologies supported.

Figure 2:
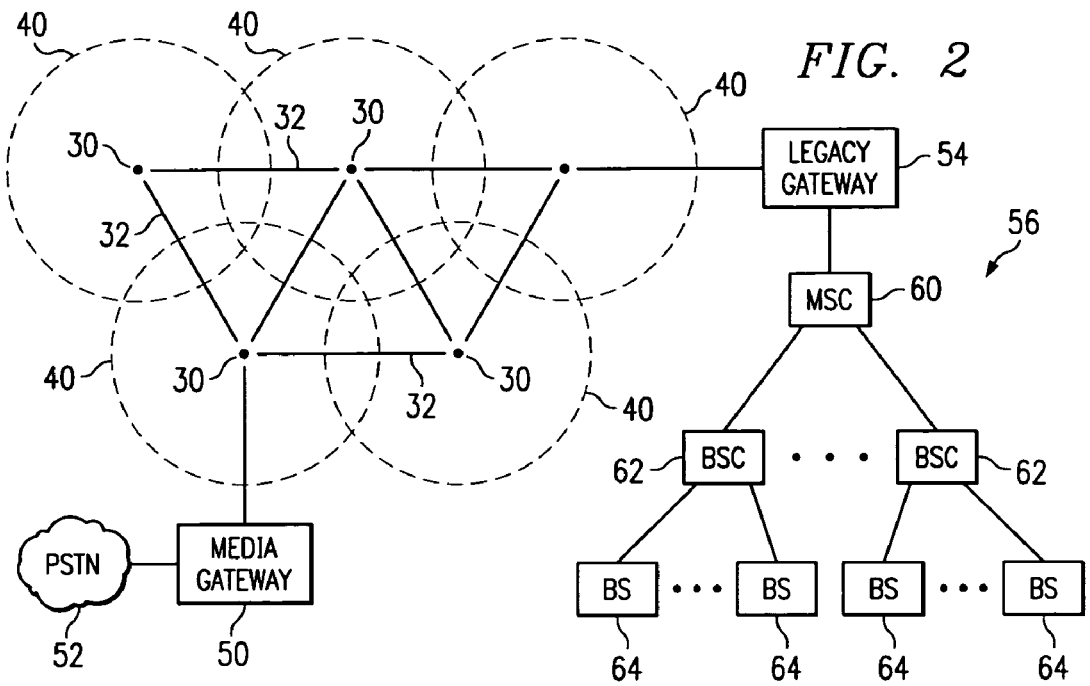
FIG. 2 is a block diagram illustrating connection of the wireless router network of FIG. 1 to traffic and control interfaces in accordance with one embodiment of the present invention.

FIG. 2 illustrates connection of the wireless router network to service gateways in accordance with one embodiment of the present invention. In this embodiment, the wireless router network is directly connected to the gateways. It will be understood that the wireless router network may be connected to one or more of the gateways through the core IP network. Thus, the gateways may be remote or local to the wireless routers 30.

Referring to FIG. 2, a media gateway 50 connects the wireless routers 30 to a public switched telephone network (PSTN) 52. A legacy gateway 54 connects the wireless routers 30 to a G2/G3 or other legacy cellular network 56. The legacy cellular network 56 includes a mobile switching center (MSC) 60 providing switching functionality for a plurality of base station controllers (BSC) 62 that each control a plurality of base stations (BS) 64. The gateways 50 and 54 allow the wireless routers 30 to communicate traffic between a mobile device 44 in a corresponding cell 40 and a wireline phone in the PSTN 52 or mobile device in the legacy cellular network 56.

Figure 3:
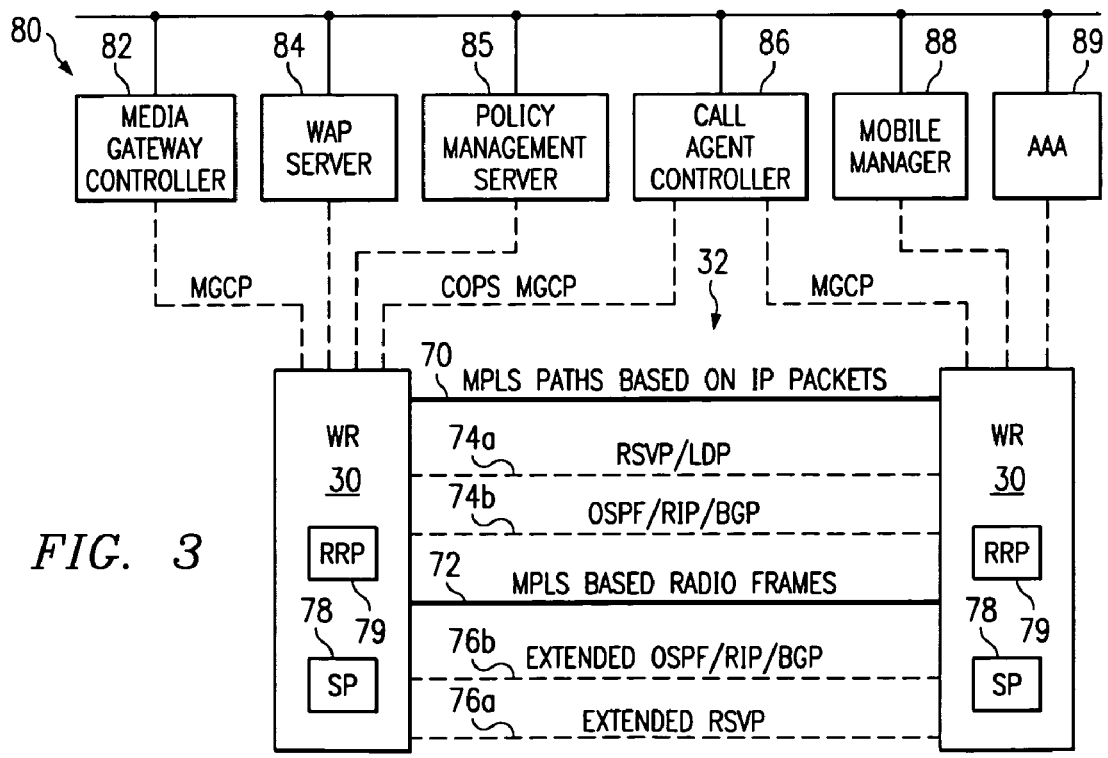
FIG. 3 is a block diagram illustrating details of the communication paths between the wireless routers of FIG. 1 in accordance with one embodiment of the present invention.

FIG. 3 illustrates details of the wireless router links 32 and the control link between the wireless routers 30 and the traffic and control interfaces in accordance with one embodiment of the present invention. In this embodiment, the wireless routers 30 communicate with each other through virtual paths, or circuits configured in the wireline links 22. It will be understood that the wireless routers 30 may otherwise suitably communicate with one another through IP or other flows in the wireline or other suitable links.

Referring to FIG. 3, the wireless router links 32 include a wireline specific virtual tunnel, or path 70 and a wireless specific virtual tunnel, or path 72. The wireline virtual tunnel 70 transports wireline protocol traffic, or packets between the wireless routers 30. The wireline virtual tunnel 70 may be set up and maintained by one or more wireline-specific control channels 74. The control channels 74 include signaling channel 74a and routing message channel 74b. The wireless virtual tunnel 72 transports wireless protocol traffic, or packets between the wireless routers 30. The wireless virtual tunnel 72 may be set up and maintained by one or more wireless-specific control channels 76. As described in more detail below, the control channels 76 may include a signaling channel 76a used by a signaling protocol 78 and a routing message channel 76b used by a radio routing protocol 79.

In one embodiment, the wireline protocol traffic comprises IP packets and the wireless protocol traffic comprises radio frames. As described in more detail below, the wireline virtual tunnel 70 is used by the wireless routers 30 for call set up, resource reservation, air bandwidth allocation and routing of calls in the wireless network 10. The wireless virtual tunnel 72 is used for soft handoff and mobility management of calls within the wireless network 10. The virtual paths 70 and 72 may be set up on a per neighbor, per call or other suitable basis. In addition, multiple virtual paths 70 and/or 72 may be provided for each neighbor and/or call.

In a particular embodiment, the virtual paths 70 and 72 are each a multi-protocol label switch (MPLS) path. The MPLS paths provide high speed multicasting and rerouting of traffic for soft handoff operations. In the MPLS embodiment, IP packets and radio frames are routed based on MPLS labels added by the wireless routers 30. The wireline MPLS paths 70 may be provisioned and controlled based on resource reservation protocol (RSVP), label distribution protocol (LDP), open shortest path first (OSPF), routing information protocol (RIP), and border gateway protocol (BGP) channels 74.

The wireless MPLS path 72 may be provisioned and controlled using extended RSVP, OSPF, RIP, and/or BGP channels 76. In this embodiment, the signaling protocol 78 is used by the wireless routers 30 to set up and tear down paths and to perform resource reservation, resource updates, path routing, and soft handoffs. The signaling protocol may be an extension of existing RSVP/LDP protocols, use a specialized circuit, or be established using transport control protocol (TCP) or signal as the transport protocol.

The radio routing protocol 79 is used by the wireless routers 30 to communicate routing messages over the routing message channel 76b. In particular, the wireless router 30 makes forwarding decisions using the radio routing protocol 79 as well as the destination IP address, MPLS labels and call ID based on an IP forwarding table, IP to MPLS path forwarding table, MPLS incoming path to outgoing forwarding table, call ID to LSP ID, a bit map of active LSPs to a given sector for a given call ID, and list of router IDs for a given path. Each outgoing decision has primary and secondary paths. If the primary path fails, the secondary path is used for the outgoing traffic. The radio routing protocol 79 is also used to load and maintain the forwarding table within each wireless router 30, maintain an overall consistent view of the topology of the network, and the reachability within the network. In addition, the radio routing protocol 79 responds to dynamic changes in the network's topology or reachability state and selects optimal paths based on a consistent interpretation of a per-hop cost or other metric.

To support services for the wireless traffic, the wireless routers may access traffic and control interfaces 80. The traffic and control interfaces 80 may include a media gateway controller 82, wireless application protocol (WAP) server 84, policy management server 85, call agent controller 86, mobile manager 88, and AAA server 89. The wireless routers 30 may communicate with the traffic and control interfaces 80 through media gateway control protocol (MGCP), common open policy service (COPS) and other suitable protocols.

Figure 4A:
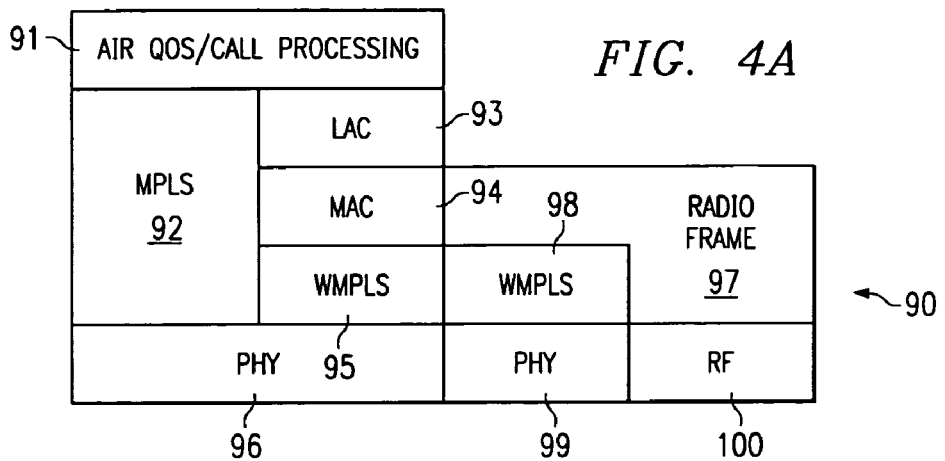
FIGS. 4A–C are a series of block diagrams illustrating protocol stacks for the mobile device, wireless router, and wireline router of FIG. 1 in accordance with one embodiment of the present invention.
Figure 4B:
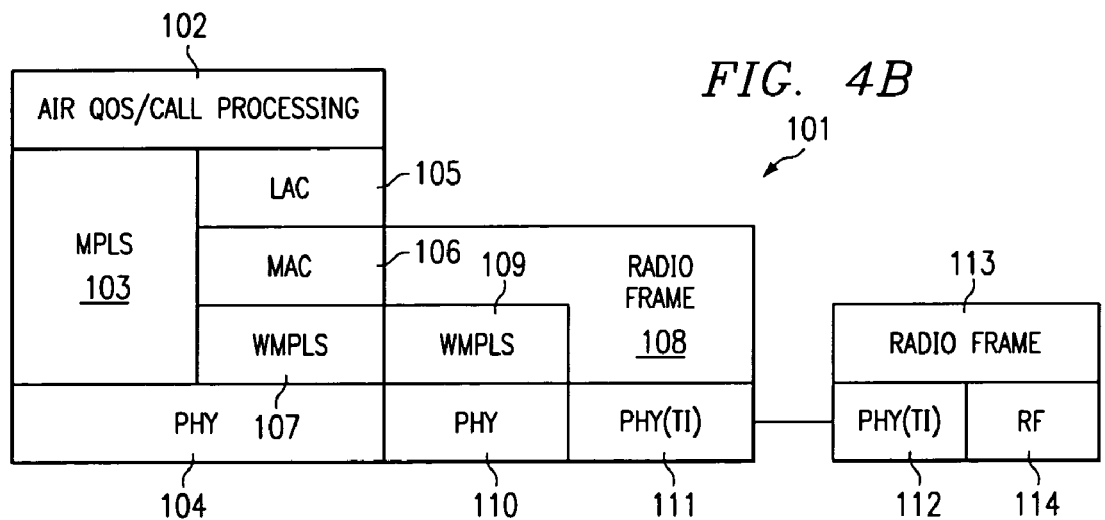
Figure 4C:
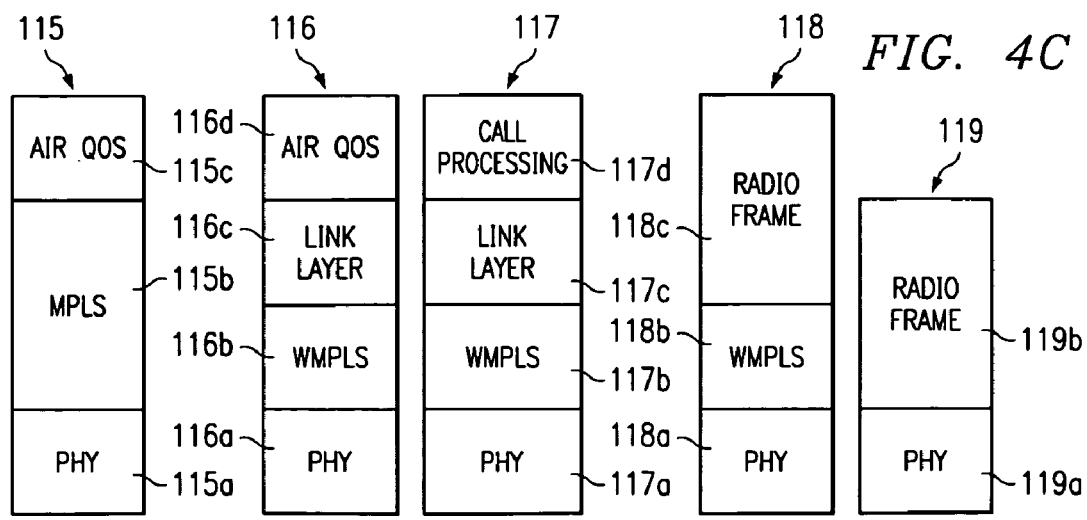

FIGS. 4A–C illustrate protocol stacks for the mobile devices 44, wireless-specific routers 30, and wireline-specific routers 20 in accordance with one embodiment of the present invention. In this embodiment, the protocol stacks are transparent to the upper layer protocols. It will be understood that other suitable types of protocols may be used for or in connection with the wireless-specific routers 20 30.

FIG. 4A illustrates a protocol stack for a wireless router 30 including an integrated base station. In this embodiment, the wireless router 30 includes a protocol stack 90 including wireless QoS/call processing layer 91, MPLS layer 92, link access control (LAC) layer 93, media access control (MAC) layer 94, wireless MPLS (WMPLS) layer 95, physical layer 96, radio frame layer 97, WMPLS layer 98, physical layer 99, and RF layer 100. Packets, which may be any suitable datagram, from the core IP network are received by the physical layer 96 and processed by the MPLS layer 92 and air QoS/call processing layer 91. Packets communicated between the wireless routers 30 are processed through the air QoS/call processing layer 91, LAC layer 93, MAC layer 94, WMPLS layer 95 and physical layer 96 on the transmit side and by the physical layer 99, WMPLS layer 98 and radio frame layer 97 on the receive side. Transmissions from the wireless router 30 to a mobile device 44 are transmitted through the radio frame layer 97 and RF layer 100.

FIG. 4B illustrates a protocol stack 101 for a wireless router 30 with a remote base station. The protocol stack 101 includes a wireless QoS/call processing layer 102, MPLS layer 103, physical layer 104, LAC layer 105, MAC layer 106, WMPLS layer 107, radio frame layer 108, WMPLS layer 109, physical layer 110, and physical layer 111 at the wireless router 30. At the base station, the protocol stack 101 includes physical layer 112, radio frame layer 113, and RF layer 114. Packets are received by the wireless router 30 from the core IP network and communicated between the wireless routers 30 as previously described in connection with protocol stack 90. Communication from the wireless router 30 to the remote base station are processed by the radio frame layer 108 and the physical (T1) layer 111. At the base station, packets from the wireless router 30 are received by the physical (T1) layer 112 and processed by the radio frame layer 113. Radio frames are transmitted from the base station though the RF layer 114.

FIG. 4C illustrates discrete protocol stacks for different types of traffic transmission within the network. In particular, protocol stack 115 is used for core IP communications in which packets are processed by physical layer 115a, MPLS layer 115b, and air QoS layer 115c. Protocol stack 116 is used in the wireless router 30 for user traffic. In this embodiment, user traffic is processed by physical layer 116a, WMPLS layer 116b, link layer 116c and air QoS layer 116d. Protocol stack 117 is used in the wireless router 30 for signal traffic. In this embodiment, signal traffic is processed by physical layer 117a, WMPLS layer 117b, link layer 117c, and call processing layer 117d. Protocol stack 118 is used for inter wireless router 30 communications in which radio frames are processed by physical layer 118a, WMPLS layer 118b and radio frame layer 118c. Protocol stack 119 is used in a base station to communicate with the mobile device 44. The mobile device 44 is communicated with through RF physical layer 119a and radio frame layer 119b.

FIGS. 5A–B illustrate packets for transmission in the MPLS paths 70 and 72 between routers 20 and/or 30 in accordance with one embodiment of the present invention. In particular, FIG. 5A illustrates a wireline protocol packet 120 for transmission in the wireline MPLS path 70. FIG. 5B illustrates a wireless protocol packet 122 for transmission in the wireless MPLS path 72.

Referring to FIG. 5A, the wireline protocol packet 120 includes an IP packet 124 and an MPLS label 126. The IP packet 124 includes an IP header 128 and data payload 130. The MPLS label 126 provides routing information for the IP packet 124 between the wireline and/or wireless routers 20 and 30. A series of MPLS labels 126 may be appended to the IP packet 124 to identify additional processing information for the IP packet 124. In this way, traffic is efficiently routed between the wireless routers 30 and distributively processed by the wireless routers 30.

Referring to FIG. 5B, the wireless protocol packet 122 includes a radio frame 132 and an MPLS label 134. The radio frame 132 includes a radio frame header 136 and a data payload 138. The radio frame 132 is used to communicate over the RF layer with the mobile devices 44. A MPLS label 134 provides routing information for the radio frame 132 between the wireless routers 30. As described in more detail below, radio frames 132 for a call are routed between an active set of wireless routers 30 for soft handoff and mobility management of the call. Additional MPLS labels may be attached to the radio frame 132 to identify additional routing and/or traffic management processing for the frame 132.

A synchronization bias field 140 may be provided in the wireless protocol packet 122 to allow synchronization of different instances of a same radio frame 132. In particular, as described in more detail below, multi-cast traffic may include a synchronization bias to ensure that all traffic is transmitted to the mobile device 44 simultaneously. Alternatively, traffic could be multi-cast at different times to account for different delays in the MPLS paths 72. Further still, traffic could be received and synchronized at the mobile device 44. For ingress traffic from mobile device 44, the instances may be synchronized based on a sequence count in place of the synchronization bias. Thus, the synchronization bias may be omitted where other information is provided for synchronization.

FIG. 6 illustrates details of the wireless router 30 in accordance with one embodiment of the present invention. In this embodiment, the wireless router 30 is implemented in a card-shelf configuration with its functionality distributed between discrete cards. The cards are connected by a mesh network, one or more buses, a backplane, or other suitable communication channel. Similarly, within each card, components are connected by a mesh network, one or more buses, a backplane, or other suitable communication channel.

Referring to FIG. 6, the wireless router 30 includes a plurality of wireless peripherals 150, a plurality of network peripherals 152, and a traffic controller 154. The wireless peripherals 150 and the network peripherals 152 each may include an interface and a network information base for processing and handling traffic received from the wireless and wireline portions of the network, respectively. The interfaces may be technology dependent or independent. In the later case, the interfaces may combine traffic from different technologies into a datagram and/or may convert between technologies.

The wireless peripherals 150 may comprise a plurality of cards to handle disparate access technologies. For example, the wireless router 30 may have separate interfaces for GSM, CDMA 2000, WCDMA, and IS-95. Similarly, the network peripherals 152 may include disparate types of cards for connections to disparate wireline formats. Thus, each wireless router 30 may support a plurality of wireless and wireline technologies. The wireless peripherals 150 may be directly connected to a radio front end which may be internal or external to the wireless router 30. In operation, the wireless and network peripherals 150 and 152 categorize and label packets for routing and grouping by traffic controller 154.

The traffic controller 154 and peripherals 152 and 150 may each be implemented in hardware, software stored in a computer-readable medium, and/or a combination of hardware and software. The hardware may comprise a field programmable gate array (FPGA) programmed to perform the functionality of cards, an application specific integrated circuit (ASIC) designed to perform the functionality of the cards and/or a general purpose processor program by software instructions to perform the functionality of the cards.

In one embodiment, the traffic controller 154 includes a QoS engine 160, selection and distribution unit 162, central processing unit (CPU) 164, timing unit 166, power and interference manager 168, packet classification module 170, IP security module 172, radio resource module 174, call processor 176, and communication module 178. The QoS engine 160 manages transmission resources within the wireless router 30. The QoS engine 160 may include a dynamic flow manager, a performance monitor, a dynamic bandwidth estimator and a multiple dimension resource queuing system for processing and handling traffic. Further information regarding the network information base, the dynamic flow manager, the performance monitor, the dynamic bandwidth estimator, and the multiple dimension resource queuing system is described in co-owned U.S. patent applications entitled "Method and System for Queuing Traffic in a Wireless Communications Network" and "Method and System for Managing Transmission Resources in a Wireless Communications Network," previously incorporated by reference.

The timing unit 166 provides synchronization for elements within the wireless router 30. The CPU 164 processes software to perform the functionality of the SDU 162. The power and interference manager 168 manages transmission power of the wireless router 30 to control interference between the wireless router 30 and adjacent or co-channel neighbors.

The SDU 162 includes a virtual path generator 180, a selector 182 a distributor 184, a segmentation and reassembly (SAR) unit 186 and traffic processing tables 190. The virtual path generator 180 configures MPLS and/or other suitable types of virtual paths using forwarding tables, trigger rules based on current conditions and other suitable criteria. As previously described, the MPLS paths allow for wireline and wireless specific traffic to be communicated between the routers 20 and/or 30.

The selector 182 and distributor 184 are used in connection with soft handoff call processing. In particular, the selector 182 selects one of a plurality of instances of ingress traffic from a mobile device 44 for forwarding to a destination device. The selector 182 synchronizes the instances as necessary and selects an instance of the packet based on pattern matching on a frame-by-frame basis, quality selection using error-correction bits or other suitable criteria. Synchronization may be based on frame sequence numbers (FSN) in the packets which include time stamps. In one embodiment, a first arriving instance of a packet meeting specified parameters is selected.

The distributor 184 multicasts egress traffic received for transmission to the mobile device 44. Traffic is multicast to an active set of wireless routers 30 for simultaneous transmission to the mobile device. In this way, the mobile device 44 may communicate with a plurality of wireless routers 30 to ensure its call is not dropped at the cell boundaries or otherwise.

The SAR unit 186 segments IP packets received from the wireless network into radio frames for transmission to the mobile devices 44 and/or to secondary wireless routers 30 for transmission to the mobile devices 44. The SAR unit 186 reassembles radio frames received from the mobile devices 44 into IP packets for transmission within the core IP network.

The traffic processing tables 190 include routing tables and forwarding tables for processing traffic. Based on the routing tables and the forwarding tables, the traffic controller 154 adds MPLS labels to IP packets and to radio frames for routing in the network 10. As described in more detail below, the traffic processing tables 190 also include a list of all active calls for the wireless router 30 and a bandwidth allocation table.

The packet classification module 170 classifies packets based on label and/or header information for processing within the traffic controller 154. The IP security module 172 does IPSec protocol or other security protocol. The radio resource module 174 does radio resource management. The call processor 176 sets up calls in the traffic controller 154 and includes the radio routing protocol 79. The communication module 178 allows the traffic controller 154 to communicate with gateways, services, policy managers, IP routers, base stations, call agents and other suitable remote nodes and resources.

During operation, when a call arrives, a list of wireless routers 30 are identified from the active list. The radio routing protocol 79 considers the metric for each given LSP between two wireless routers and identifies a list of router IDs and LSPs for a given tail-end router ID, where the head-end is the point at which traffic is transmitted in the LSP and the tail-end is the point at which traffic is received from the LSP. Correspondingly, the bit map of the call ID and the next hop LSP is updated. Path, burst, and bandwidth allocations are negotiated and set up during the set up of the LSPs. Next, the LSPs are set up as per the active list given by the mobile device and routing protocol 79. The primary is selected and a multicasting path is enabled as well as incoming paths for the selection are enabled. Due to mobility, wireless routers 30 are added and deleted from the active list. Thus, the radio routing protocol 79 is consulted for new LSPs as well as for deletions. After obtaining new LSPs from the radio routing protocol 79, the LSPs are set up after negotiation.

After call set up, traffic is routed by the radio routing protocol 79 as previously described. In one embodiment, two anchoring points are provided for traffic distribution. The first anchoring point is located at the interface between the core IP network and the air router, or gateway network. This anchoring point is fixed in the wireline and need not move to other gateways as the mobile device 44 moves. For mobile devices that travel long distances, the first anchoring point may be moved by identifying a new anchoring point, configuring the new anchoring point for the call, and informing the ends of the call or session of the new anchor point.

In operation, after receiving the traffic from the core IP network, the edge gateway forwards traffic through the pre-established or dynamic MPLS path to the current primary node in the active list. The current primary node in the active list is the second anchoring point. The primary node is responsible for distribution of the traffic to all secondary nodes in the active list. Distribution of the traffic is accomplished using MPLS multicast. Initially, the multicast path is set up between current primary and other nodes in the active list during the call establishment phase.

As the mobile device moves from the primary node, power levels at the primary unit will degrade. If the power falls below a certain drop threshold, the primary wireless router may determine a next primary router using the control message from the mobile unit. The control message includes the power level associated with the new primary. In particular, the radio routing protocol 79 determines if the primary anchoring point needs to be changed which depends on the radius of coverage and the metrics of the LSPs from the new primary to members in the active list.

For micro mobility, the existing primary router signals the new primary router indicating the handover of the primeship as well as the list of active wireless routers. After receiving the control message, the new primary router which is receiving the strongest signals confirms that it is ready to take over control of traffic distribution. It establishes the multicast MPLS paths for the secondary routers in the active list. This may be accomplished using another control message back to the current primary node indicating that the new node is ready to host the multicast.

Figure 7:
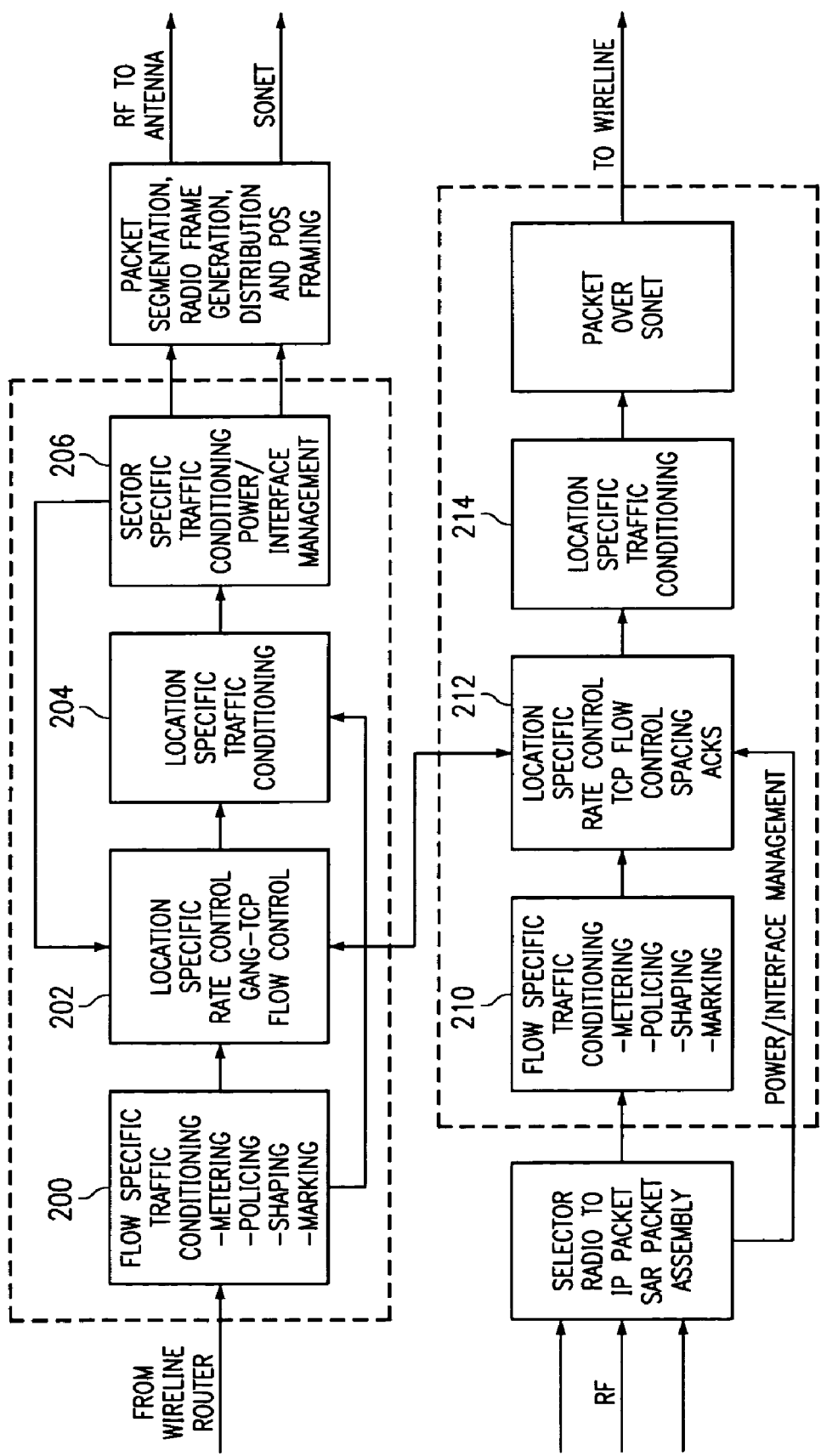
FIG. 7 is a block diagram illustrating details of the quality of service (QoS) engine of FIG. 6 in accordance with one embodiment of the present invention.

FIG. 7 illustrates details of the QoS engine 160 of the wireless router 30 in accordance with one embodiment of the present invention. In this embodiment, IP packets for flows transmitted through the wireless routers 30 are buffered in the queuing system 30 for traffic shaping and conditioning. Wireless specific radio frames in the MPLS paths are not queued to maintain synchrony of the frames.

Referring to FIG. 7, traffic from a wireline router 20 is received at the QoS engine 160 and flow-specific traffic conditioning 200 applied by metering, policing, shaping and marking the traffic. Location-specific rate control and TCP flow control 202 are then applied to the traffic. Location-specific traffic conditioning 204 is next applied, followed by sector specific traffic conditioning and power/interface management 206. The conditioned traffic is then passed to the SAR unit 186 for segmentation into the radio frames and transmission to the mobile devices 44.

For traffic received from the mobile devices 44, the SAR unit 186 reassembles the radio frames into an IP packet. Flow-specific traffic conditioning 210 is applied to the IP packet by metering, policing, shaping, and marking the packet. Location-specific rate control and TCP flow control 212 is next applied to the packet. Next, location-specific traffic conditioning 214 is applied to the packet. The conditioned packet is then transmitted over the wireline network.

Figure 8:
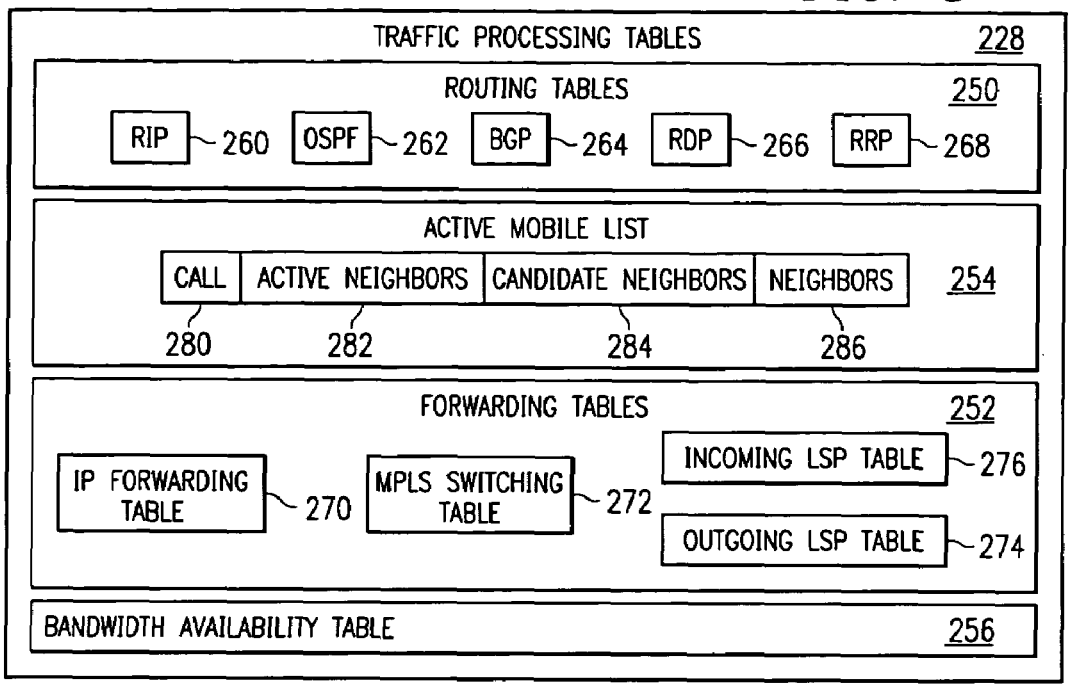
FIG. 8 is a block diagram illustrating details of the traffic processing tables of FIG. 6 in accordance with one embodiment of the present invention.

FIG. 8 illustrates details of the traffic processing tables 190 in accordance with one embodiment of the present invention. In this embodiment, the traffic processing tables 190 include routing tables 250, forwarding tables 252, active mobile list 254 and bandwidth availability table 256. Routing tables 250 include a RIP table 260, OSPF table 262, BGP table 264 radio discovery protocol (RDP) table 266 and radio routing protocol (RRP) table 268. The RDP table 266 is described in detail in co-owned U.S. patent application entitled "Method and System for Configuring Wireless Routers and Networks," previously incorporated by reference. The RRP table 268 is configured from the RDP table 266 and includes dynamic routing information for the network. In particular, the RRP table 268 maintains a list of routers for each path of an active call. The routing tables 250 are used to construct the forwarding tables 252.

The forwarding tables 252 include an IP forwarding table 270, MPLS tunnel table 272, outgoing LSP table 274 and incoming LSP table 276. The IP forwarding table 270 represents the IP topology for the network 10 and is further described below in connection with FIG. 9. The MPLS tunnel table 272 represents the RF topology for the network 10 and is further described below in connection with FIG. 10. The outgoing LSP table 274 identifies multi-cast LSPs for soft handoff call processing and is further described below in connection with FIG. 11. The incoming LSP table 276 identifies the LSPs used in connection with selection operations for soft handoff call processing and is further described below in connection below with FIG. 12. The LSPs are maintained on a per call basis for active calls. The bandwidth availability table 256 provides reserved bandwidth for soft handoff call processing and is further described below in connection with FIG. 13.

The active mobile list 254 is maintained on a per call basis. For each call, the active mobile list 254 stores a call identifier 280, active neighbors 282, candidate neighbors 284, and all neighbors 286. The active neighbors 282 are neighbors of the wireless router 30 that are actively processing the call along with the wireless router 30. The candidate neighbors 284 are neighbors of the wireless router 30 that are situated to process the call but are not actually engaged in call processing. All neighbors 286 include all potential neighbors for the wireless router 30.

FIG. 9 illustrates details of the IP forwarding table 270 in accordance with one embodiment of the present invention. In this embodiment, the IP forwarding table 270 includes a destination IP address, outgoing interface ID for primary and secondary routers, outgoing port ID for primary and secondary routers, data link address (logical circuit) for primary and secondary routers, hop count associated with destination for primary and secondary routers and multicast indicator. The secondary routers are used in response to failure of the primary router. It will be understood that the IP forwarding table 270 may be otherwise implemented in connection with the present invention.

FIG. 10 illustrates details of the MPLS tunnel table 272 in accordance with one embodiment of the present invention. In this embodiment, the MPLS tunnel table 272 includes a head end router ID, tail end router ID, next hop router ID, label, tunnel ID, next hop router ID, type of service (TOS), outgoing interface ID, delay metric, throughput metric, level three ID used by the tunnel, local rerouting for protection, set up priority, holding priority, number of hops, and delay constraint. It will be understood that the MPLS tunnel table 272 may be otherwise implemented in connection with the present invention.

FIG. 11 illustrates details of the outgoing LSP table 274 in accordance with one embodiment of the present invention. The LSPs are predefined based on the RF network topology and can be readily activated by the wireless router 30 for soft handoff call processing. In this embodiment, the outgoing LSP table 274 maintains a list of all potential LSPs for each active call on a sector by sector basis. Each LSP is associated with another wireless router 30. Each LSP to a router 30 is activated for a call by writing a "1" into the LSP for the router 30 and the call. Similarly, a LSP is deactivated by writing a "0" in the LSP.

FIG. 12 illustrates details of the incoming LSP table 276 in accordance with one embodiment of the present invention. In this embodiment, the incoming LSP table 276 maintains a list of all potential LSPs for each active call on a per sector basis. Each LSP is associated with another wireless router 30. Each LSP to a router 30 is established by writing a "1" into the LSP for the wireless 30 in the call. Similarly, a LSP is deactivated by writing a "0" in the LSP. In this way, as described in connection with the outgoing LSP table 274, the LSPs are predefined based on the network RF topology and can be readily activated by the wireless router 30 for soft handoff call processing. The sectors are one or more wireless routers.

Figures 13, 14:
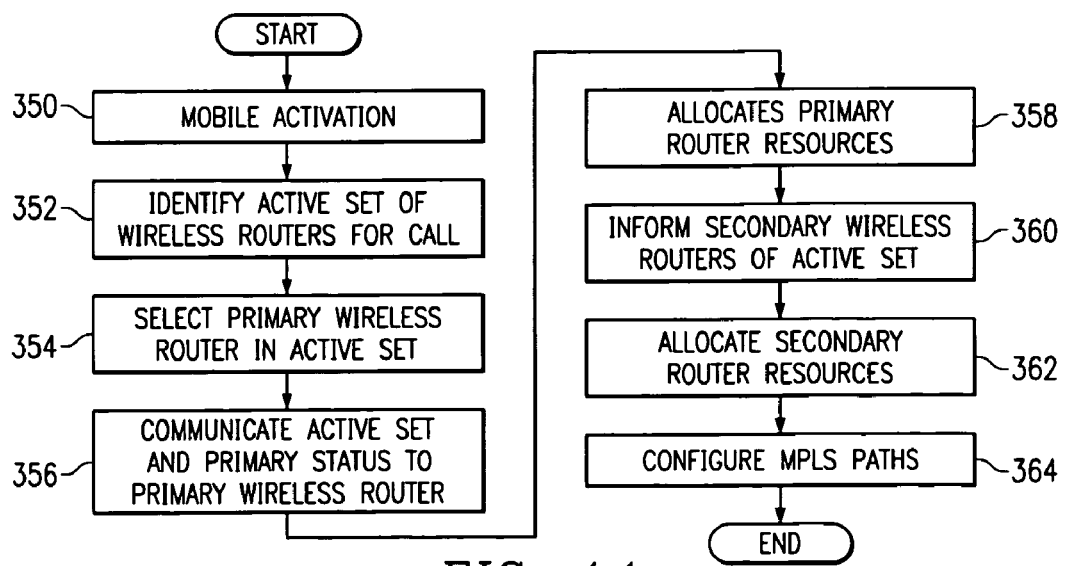
FIG. 13 is a block diagram illustrating details of the soft handoff bandwidth availability table of FIG. 8 in accordance with one embodiment of the present invention.
FIG. 14 is a flow diagram illustrating a method for configuring the wireless routers of FIG. 1 for call processing in accordance with one embodiment of the present invention.

FIG. 13 illustrates details of the soft handoff bandwidth availability table 256 in accordance with one embodiment of the present invention. In this embodiment, reserved and available bandwidth for soft handoffs for each neighboring router are stored for outgoing and incoming LSPs. The neighbors may be adjacent or co-channel neighbors. Label ranges for the soft handoff are also stored for each neighboring router. It will be understood that additional or other information may be stored and that available bandwidth may be otherwise determined in connection with the present invention.

FIG. 14 is a flow diagram illustrating a method for configuring the wireless routers for call processing in accordance with one embodiment of the present invention. The method begins at step 350 in which a mobile device 44 is activated. Next, at step 352, the mobile device 44 identifies an active set of wireless routers 30 for the call. The active set may be identified based on responses received from base stations/wireless routers 30 in the area of the mobile device 44.

Proceeding to step 354, the mobile device 44 selects a primary wireless router 30 for the active set. The primary wireless router 30 may be the wireless router closest to the mobile device 44 returning the strongest signal. At step 356, the mobile device 44 communicates the active set and the status as primary to the primary wireless router 30. At step 358, the primary wireless router 30 allocates resources for the call.

Next, at step 360, the primary wireless router 30 informs the secondary wireless routers 30 in the active set of their status as secondary wireless routers 30. At step 362, the secondary wireless routers 30 allocate resources for the call. Next, at step 364, MPLS paths are configured between the primary and secondary routers 30 for processing of the call. Step 364 leads to the end of the process by which call-setup is performed by wireless routers 30 in a distributed system architecture.

Figure 15:
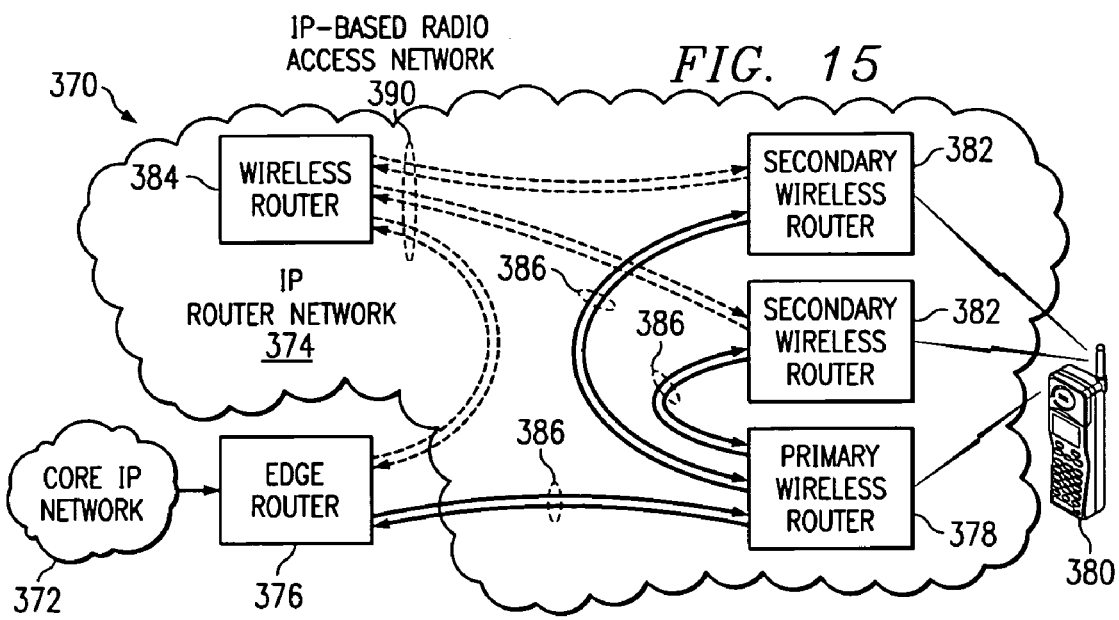
FIG. 15 is a block diagram illustrating soft handoff and micro mobility for a call in an exemplary wireless communications network.

FIG. 15 illustrates soft handoff of a call in an exemplary wireless communications network 370. Referring to FIG. 15, the exemplary network 370 includes core IP network 372 coupled to a wireless router network 374 through an edge wireless router 376. The wireless router network 374 includes a primary wireless router 378 for a call of a mobile device 380 and secondary wireless routers 382. Wireless router 384 is currently inactive for the call.

LSPs 386 are configured between the primary and wireless routers 378 and 382 and between the primary and edge wireless routers 378 and 376. The primary and edge wireless routers 378 and 376 form anchoring points for call processing at the edge of the core IP network and at the primary wireless router 378. The LSPs 386 provide synchronized framing for distribution and selection between neighbors of wireless traffic and fast rerouting for soft handoff using RSVP.

In response to the wireless unit 380 transitioning location and identifying a new active set including wireless router 384 as the new primary wireless router, the LSPs 386 are terminated and LSPs 390 established for soft handoff operations. It will be understood that the new primary wireless router may be a previous secondary wireless routers in an active set for the call. Further information regarding soft handoff and mobility management are described in more detail below in connection with FIGS. 16–20.

Figure 16:
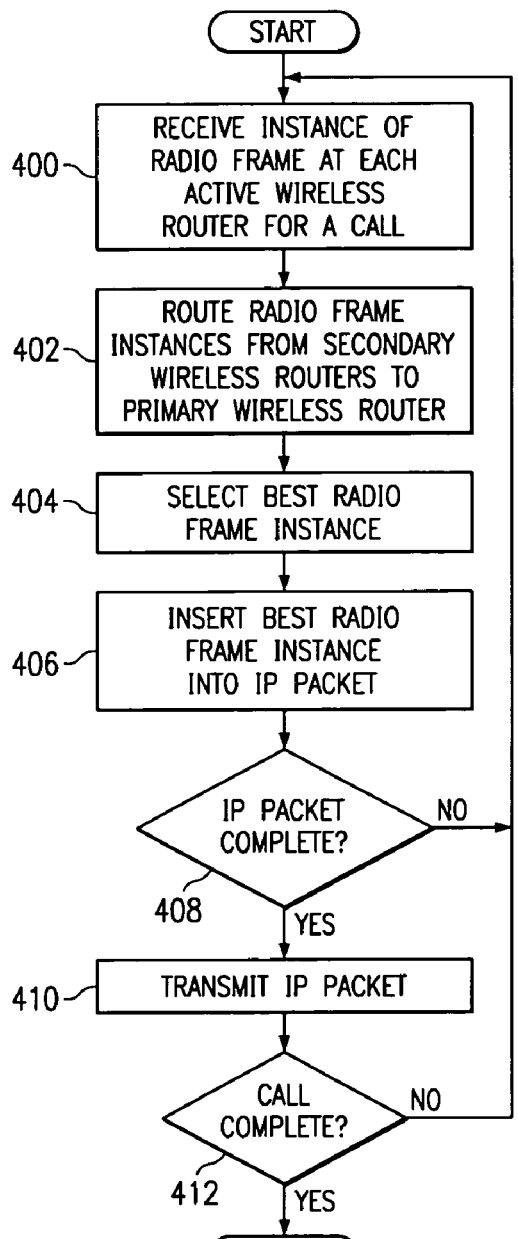
FIG. 16 is a flow diagram illustrating a method for selecting ingress wireless traffic from an active set of wireless routers for soft handoff of a call in accordance with one embodiment of the present invention.

FIG. 16 is a flow diagram illustrating a method selecting ingress wireless traffic from an active set of wireless routers for soft handoff in accordance with one embodiment of the present invention. The method begins at step 400 in which an instance of a radio frame is received at a plurality of wireless routers 378 and 382 in an active set of wireless routers for a call. Next, at step 402, instances from the secondary wireless routers 382 are routed to the primary wireless router 378.

Proceeding to step 404, the primary wireless router 378 selects one of the radio frame instances for transmission to the destination device for the call. As previously discussed, an instance radio frame may be selected based on frame quality. Thus, the highest quality instance of the radio frame is chosen for transmission to the destination device. At step 406, the selected instance of the radio frame is inserted into an IP packet for transmission over the core IP network.

Next, at decisional step 408, if the IP packet is incomplete, the No branch returns to step 400 in which instances of a next radio frame of the call are received and one of the instances selected for insertion into the IP packet. After the IP packet is complete, the Yes branch of decisional step 408 leads to step 410. At step 410, the IP packet is transmitted over the core IP network 372 to the destination device.

Next, at decisional step 412, if the call is not completed, the No branch returns to step 400 in which instances of a next radio frame continue to be received, processed, and packetized for transmission to the destination device. Upon completion of a call, the Yes branch of decisional step 412 leads to the end of the process by which soft handoff is performed by the distributed wireless routers.

Figure 17:
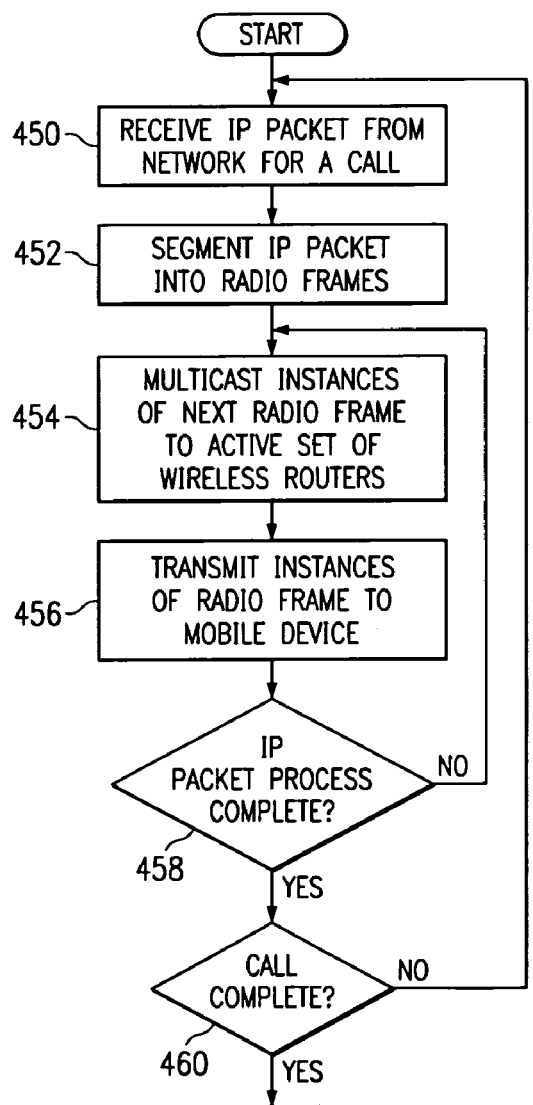
FIG. 17 is a flow diagram illustrating a method for distributing egress wireless traffic between an active set of wireless routers for soft handoff of a call in accordance with one embodiment of the present invention.

FIG. 17 is a flow diagram illustrating a method for distributing egress wireless traffic between an active set of wireless routers for soft handoff in accordance with one embodiment of the present invention. The method begins at step 450 in which an IP packet is received from the core IP network 372 and forwarded to the primary wireless router 378. At step 452, the IP packet is segmented into radio frames for transmission to the mobile device 380.

Proceeding to step 454, instances of the next radio frame in the IP packet are multicast to the secondary wireless routers 382 in the active set of routers based on the MPLS multicast table 274. At step 456, instances of the radio frame are transmitted from each of the active routers 378 and 382 to the mobile device 380 for maximum signal reception. The signals are transmitted synchronously to the mobile device 380 by bypassing queuing for the multicast radio frames. In one embodiment, one or more of the primary and/or secondary wireless routers may drop the packets due to weak radio links, suitable number of other links, or other suitable operational reasons.

Next, at decisional step 458, if radio frames in the IP packet have not been completely processed, the No branch returns to step 454 in which the next radio frame is multicast for transmission to the mobile device 380. Upon completion of processing the radio frames in the IP packet, the Yes branch of decisional step 458 leads to decisional step 460.

At decisional step 460, if the call is not complete, the No branch returns to step 450 in which the next IP packet for the call is received and processed as previously described. Upon call completion, the Yes branch of decisional step 460 leads to the end of the process by which soft handoff is provided for egress traffic.

Figure 18:
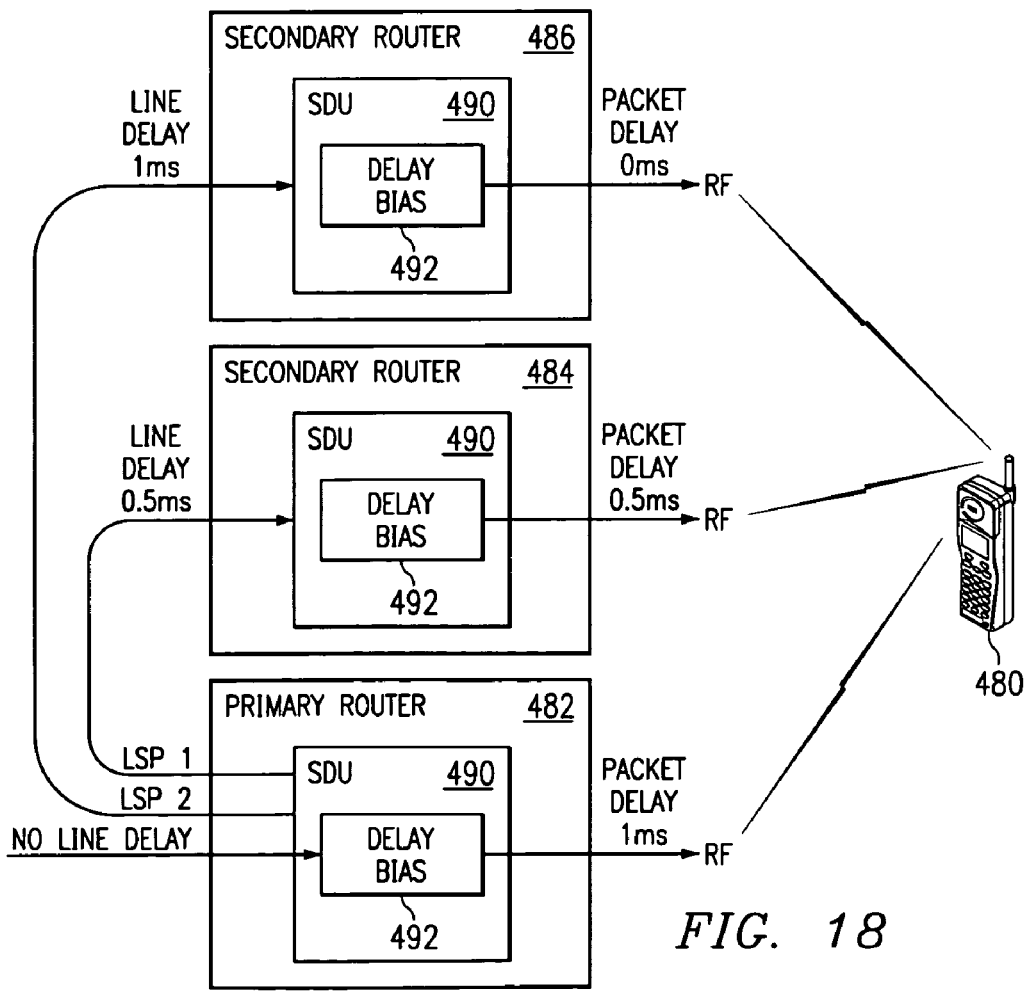
FIG. 18 is a block diagram illustrating delay biasing of egress wireless traffic for soft handoff of a call in an exemplary wireless communications network.

FIG. 18 illustrates a method for synchronizing multicast egress traffic in accordance with one embodiment of the present invention. In this embodiment, traffic for a mobile device 480 is received from the core IP network at a primary router 482. The primary router 482 multicast the signal to secondary router 484 over LSP1 and to secondary router 486 over LSP2. LSP1 has a line delay of 0.5 milliseconds while LSP2 has a line delay of 1.0 millisecond. The primary router directly transmits a signal to the mobile device 480 and thus has no line delay.

To account for the differing line delays in the LSPs, each SDU 490 includes a delay bias 492. The SDU 490 for the primary router adds a synchronization bias of 0 milliseconds to traffic transmitted through to LSP2, of 0.5 milliseconds of traffic transmitted through LSP1, and of 1 millisecond for traffic directly transmitted from the primary router 482. The synchronization bias is included within the wireless protocol packet 122 as previously described in connection with FIG. 5B.

In each router 482, 484, and 486, the delay bias 492 applies the synchronization bias 140 to delay packet transmission to the mobile device 480. Thus, the primary router 482 will transmit the packet 1.0 milliseconds after receipt due to delay biasing, while the secondary router 484 will transmit the packet 0.5 milliseconds after transmission from the primary router 482 due to line delay plus 0.5 milliseconds after receipt due to delay biasing for a total of a 1.0 millisecond delay and the secondary router 486 will transmit the packet 1.0 millisecond after transmission from the primary router 482 due to line delay and 0 milliseconds after receipt due to delay biasing for a total of a 1.0 millisecond delay. Accordingly, the packets will be simultaneously transmitted for receipt and processing by the mobile device 480. It will be understood that the packets may be otherwise synchronized without departing from the scope of the present invention.

In the illustrated embodiment, the synchronization bias is equal to the maximum delay of an LSP for the active set. The synchronization bias is adjusted each time the active set of wireless routers 30 changes to be the maximum delay of the LSPs for the current active set. Thus, the synchronization bias is dynamically adjusted based on the active set of wireless routers 30 for a call.

Figure 19:
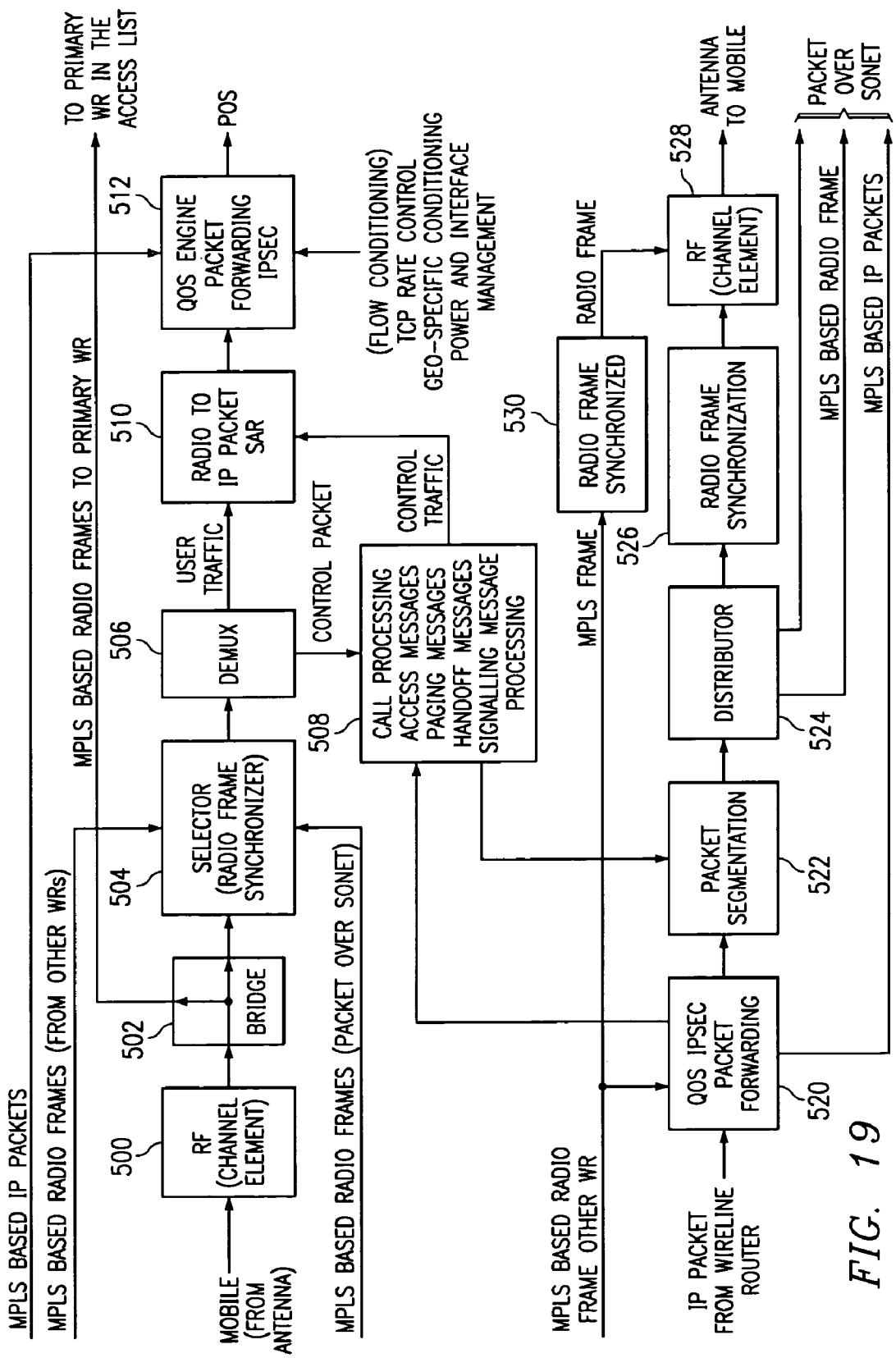
FIG. 19 is a block diagram illustrating soft handoff functionality of the wireless router of FIG. 6 in accordance with one embodiment of the present invention.

FIG. 19 illustrates soft handoff functionality of the wireless router 378 and 382 in accordance with one embodiment of the present invention. In this embodiment, the radio frames are IS-95 frames used in connection with CDMA cellular technology. It will be understood that the methodology may be used in connection with any other suitable types of radio frames.

Referring to FIG. 19, mobile traffic is received as IS-95 frames from the mobile device 380. The radio frames are passed to bridge 502 which transmits the frames to the primary wireless router 378 through the LSPs 386. For the primary wireless router 378, selector 504 receives radio frames from the local RF element 500 and from the secondary wireless routers 382. The selector selects a highest quality IS-95 frame and passes it to the demultiplexer 506. The demultiplexer demultiplexes user data and signals. The multiplex traffic is passed to traffic control 508 or SAR unit 510.

Traffic control 508 performs call processing, access messaging, paging messaging, handoff messaging, signal messaging and other control of flows in the wireless router. Control traffic from traffic control 508 and user traffic from the demultiplexer 506 are passed to the SAR unit 510 for reassembly into IP packets. The IP packets afforded to the QoS engine 512 for flow conditioning including TCP rate control, geo-specific conditioning, power and interface management. From the QoS engine 512, packets are embedded in the SONET protocol and transmitted over the core IP network 372.

IP packets from a wireline router in the core IP network 372 are received at the wireless router 378 or 382 at the QoS engine 520. From the QoS engine, traffic may be passed to the traffic control 508 for processing, passed to SAR unit 522 for segmentation, or routed to another wireless router in the POS format. At packet segmentation 522, IP packets are segmented into IS-95 frames which are synchronized by multiplexer 524. The IS-95 frames are multicast at distributor 526 from the primary wireless router 378 to the secondary wireless routers 382. For the primary wireless router 378, the IS-95 frame is passed from the distributor 526 to the RF channel element 528 for forwarding to the antenna for transmission to the wireless device 380. For secondary wireless routers 382, the IS-95 frame is received from the primary wireless router 378 and synchronized 530 prior to being passed to the RF channel element 528.

Figure 20:
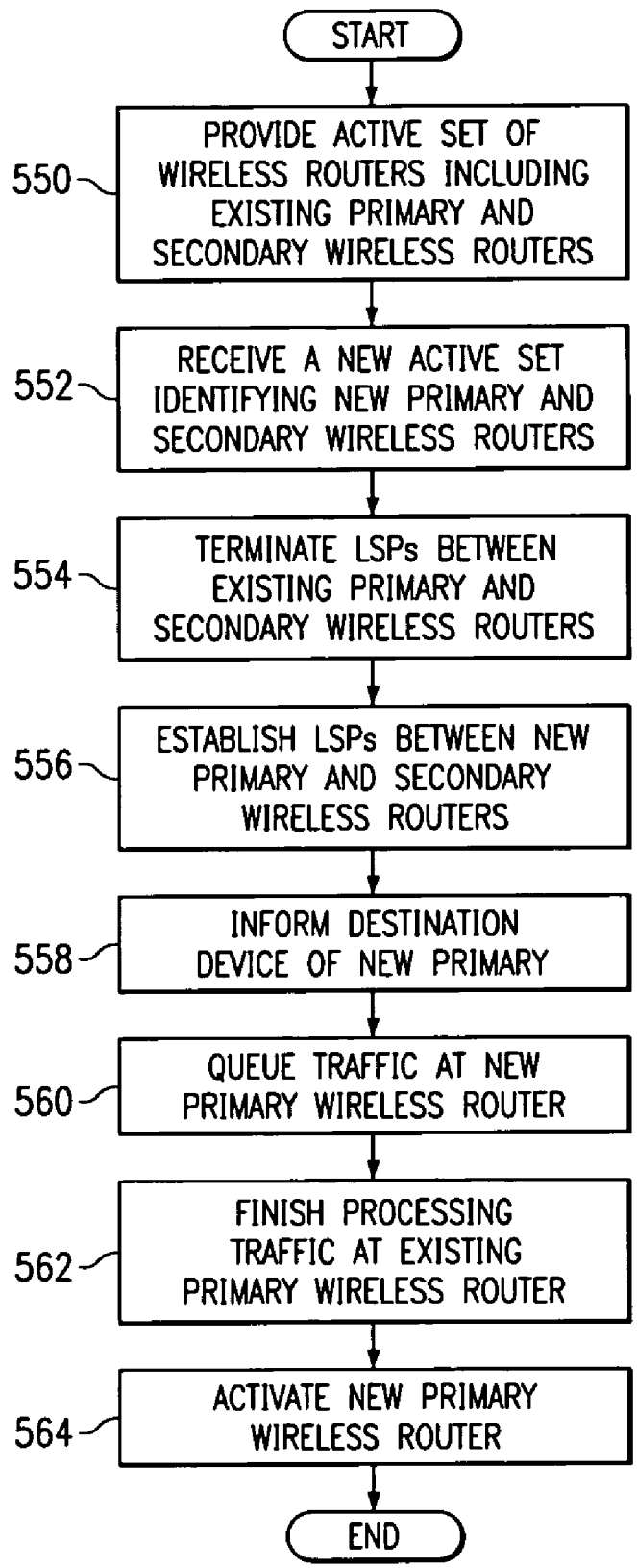
FIG. 20 is a flow diagram illustrating a method for managing mobility of wireless devices between the wireless routers of FIG. 2 in accordance with one embodiment of the present invention.

FIG. 20 illustrates a method for mobility management in accordance with one embodiment of the present invention. In this embodiment, the wireless routers 378, 382, and 384 intercommunicate with one another and the mobile device 380 to provide mobility management within the network 370.

Referring to FIG. 20, the method begins at step 550 in which an active set of wireless routers are provided for a call. The active set includes an existing primary wireless router 378 and existing secondary wireless routers 382. At step 552, a new active set of wireless routers is received from the mobile device 380. The new active set of wireless routers identifies a new primary wireless router 384 and new secondary wireless routers 382. The new secondary wireless routers 382 may include some or all of the previous secondary wireless routers.

Proceeding to step 554, LSPs between the existing primary wireless router 378 and secondary wireless routers 382 are terminated. At step 556, LSPs 390 between the new primary wireless router 384 and new secondary wireless routers 382 are established. Thus, all further selection and distribution of traffic will be performed through the new primary wireless router 384.

At step 558, the existing primary wireless router 378 informs the destination device for the call of the new primary router 384. The destination device may be an edge router or the other end of a call or session. Thus, the destination device will address further traffic to the mobile device 380 to the new wireless router 384. At step 560, traffic is queued at the new primary wireless router 384 while the existing primary wireless router 378 processes existing traffic. Thus, the traffic will be delivered in the order in which it is received.

At step 562, the existing primary wireless router 378 finishes processing traffic for the call. At step 564, the new primary wireless router 384 is activated and begins to process and transmit queued traffic. In this way, mobility management is provided in a distributed architecture. In one embodiment, an activation notice is the existing primary router 378 communicating an activation notice to the new primary wireless router 384 upon processing of all queued traffic, at which point the existing primary router 378 is deactivated and the new primary wireless router 384 is activated. Hard handoffs without packet and without misordering may also be provided in this way using only primary nodes.

Although the present invention has been described with several embodiments, various changes and modifications may be suggested to one skilled in the art. It is intended that the present invention encompass such changes and modifications as fall within the scope of the appended claims.

What is claimed is:

1. A wireless router for a wireless communications network, comprising:
   a first interface operable to communicate radio frames for a call with a mobile device, the first interface operable to generate a label for each radio frames received from the mobile device;
   a second interface operable to communicate wireline packets for the call with a wireline network, the second interface operable to generate a label for each wireline packet received from the wireline network;
   a traffic controller operable to convert wireline packets received for the call from the wireline network to radio frames, to route the radio frames to the mobile device through the first interface, to convert radio frames received for the call from the mobile device to wireline packets, to route the wireline packets to the wireline network through the second interface, and to communicate with at least one secondary wireless router, wherein the traffic controller is further operable to communicate with wireline packets and radio frames with at least one secondary wireless router for soft handoff of the call and to communicate with a public switched telephone network (PSTN) gateway through the wireline network; and
   a virtual path generator operable to configure wireless virtual paths for the call in the wireline network to the at least one secondary wireless router for soft handoff processing for the call to the at least one secondary wireless router, wherein the virtual paths are multi-protocol label switched path (MPLS), the traffic controller operable to route wireline packets and radio frames to the at least one secondary wireless router over the wireless virtual paths in accordance with the labels associated with the wireline packets and the radio frames.

2. The wireless router of claim 1, wherein the radio frames and associated labels are placed into Internet Protocol (IP) packets for transport over the wireless virtual paths to the at least one secondary wireless router.

3. The wireless router of claim 1, wherein the wireless router is operable to be directly connected to a wireline IP router, the traffic controller further operable to route wireline packets through the second interface directly to the wireline IP router.

4. The wireless router of claim 1, wherein the traffic controller is a technology independent wireless traffic processor.

5. The wireless router of claim 1, wherein the call is a first call and the mobile device is a first mobile device, further comprising:
   the first interface operable to communicate radio frames for the first call with the first mobile device using a first access technology and to communicate radio frames for a second call with a second mobile device using a second access technology; and
   the traffic controller operable to convert wireline packets received for the second call from the wireline network to radio frames for the second access technology, to route the radio frames to the second mobile device through the second interface, to convert radio frames received from the second mobile device to wireline packets, and to route the wireline packets to the wireline network through the second interface.

6. The wireless router of claim 1, the traffic controller further operable to communicate with the at least one secondary wireless router through the wireline network for the soft handoff of the call.

7. The wireless router of claim 1, the traffic controller further operable to communicate with the at least one secondary wireless router through the wireline network for micromobility of the call.

8. The wireless router of claim 1, the traffic controller further operable to communicate with a call agent through the wireline network.

9. The wireless router of claim 1, the traffic controller further operable to communicate with a media gateway through the wireline network.

10. The wireless router of claim 1, the traffic controller further operable to communicate with a policy manager through the wireline network.

11. The wireless router of claim 1, the traffic controller further operable to communicate with an authentication, authorization, and accounting (AAA) server through the wireline network.

12. The wireless router of claim 1, the traffic controller operable to communicate with disparate radio access networks through the wireline network.

13. The wireless router of claim 1, the traffic controller further operable to classify wireline packets and radio frames for the call.

14. The wireless router of claim 1, the traffic controller further operable to provide security for the call.

15. The wireless router of claim 1, the traffic controller further operable to reserve radio frequency (RF) resources for the call.

16. The wireless router of claim 1, the traffic controller further operable to perform quality of service (QoS) management for the call.

17. The wireless router of claim 1, the first interface, second interface, and traffic controller each further comprising software stored on a computer-readable medium.

18. The wireless router of claim 1, the traffic controller including a selector operable to receive a first instance of a particular radio frame from the mobile device, to receive a second instance of the particular radio frame from the second router, and to select one of the first and second instances for transmission to a destination device for the call.

19. The wireless router of claim 1, the traffic controller including a distributor operable to receive wireline packets from the wireline network destined for the mobile device, to transmit a first instance of a particular wireline packet to the mobile device, and to transmit a second instance of the particular wireline packet to the at least one secondary wireless router for transmission to the mobile device.

20. The wireless router of claim 1, the first interface operable to communicate radio frame traffic for the call with the mobile device.

21. The wireless router of claim 1, the second interface operable to communicate IP traffic for the call with the wireline network.

22. The wireless router of claim 1, the first interface, the second interface, virtual path generator, and traffic controller each comprising software stored on a computer-readable medium.

23. The wireless router of claim 1, the first interface, second interface, virtual path generator, and traffic processor each comprising at least one of software stored on a computer-readable medium and hardware encoded with predefined instructions.

24. The wireless router of claim 18, the selector further operable to synchronize the first and second instances, to compare the first and second instances of the wireless traffic, and to select one of the first and second instances based on the comparison.

25. The wireless router of claim 19, the distributor further operable to transmit the second instance to the at least one secondary wireless router with a synchronization bias for synchronous transmission of the second instance with the first instance to the mobile device.

26. The wireless router of claim 1, further comprising a path generator operable to configure an Internet protocol (IP) flow in the wireline network to the at least one secondary wireless router for soft handoff processing for the call.

27. A wireless communications network, comprising:
a first wireless router;
a second wireless router;
a first wireless virtual path configured for a call between the first and second routers for transmission of wireline protocol traffic; and
a second wireless virtual path configured for the call between the first and second routers for transmission of wireless protocol traffic, the first and second wireless virtual paths each comprising a multi-protocol label switched path (MLPS), the wireline protocol traffic and the wireless protocol traffic including labels generated upon receipt of the wireline protocol traffic and the wireless protocol traffic for routing over the first and second wireless virtual paths to facilitate soft handoff of a call, wherein the wireline protocol traffic comprises Internet protocol (IP) traffic and the wireless protocol traffic comprises radio frames.

28. The wireless communications network of claim 27, the first and second wireless routers operable to intercommunicate over the second wireless virtual path to provide a soft handoff for a call.

29. The wireless communications network of claim 27, the first and second wireless routers operable to intercommunicate to allocate bandwidth for a call.

30. The wireless communications network of claim 27, the first and second wireless routers operable to intercommunicate to reserve resources for a call.

31. The wireless communications network of claim 27, the first and second wireless routers operable to intercommunicate to provide mobility management for a call.

32. The wireless communications network of claim 27, further comprising:

a set of active wireless routers for a call, the set including the first and second routers; and
the set of routers operable to intercommunicate over wireless virtual paths to provide a plurality of call mobility, soft handoff, and resource management for the call.

33. A wireless communications network, comprising:
a plurality of wireless routers; and
the plurality of wireless routers each operable to receive traffic from a mobile device, to route the traffic directly to an Internet protocol (IP) wireline network, and to intercommunicate, wherein the routers are further operable to intercommunicate to provide a soft handoff for a call including the mobile device using a multi-protocol label switch (MPLS) protocol, wherein one of the plurality of wireless routers is established as the primary router, the primary router operable to establish MPLS wireless virtual paths for the call with one or more secondary routers of the plurality of wireless routers identified as being active within the wireless communications network, the primary router operable to route the traffic to the one or more secondary routers over the MPLS wireless virtual paths according to labels assigned to the traffic upon being received from the mobile device to facilitate soft handoff of the call to the one or more secondary routers upon a determination by the primary router that it is no longer able to process the call.

34. The wireless communications network of claim 33, the plurality of wireless routers further operable to intercommunicate to reserve resources for a call including the mobile device.

35. The wireless communications network of claim 33, the plurality of wireless routers further operable to intercommunicate to allocate bandwidth to a call including the mobile device.

36. The wireless communications network of claim 33, the plurality of wireless routers further operable to intercommunicate to provide call mobility for a call including the mobile device.

37. The wireless communications network of claim 33, the plurality of wireless routers further operable to intercommunicate to establish a call for the mobile device.

* * * * *